United States Patent
Kagan

(10) Patent No.: US 12,072,210 B2
(45) Date of Patent: Aug. 27, 2024

(54) ELECTRONIC POWER METER HAVING AN END USER CUSTOMIZABLE DISPLAY

(71) Applicant: EI ELECTRONICS LLC, Westbury, NY (US)

(72) Inventor: Erran Kagan, Great Neck, NY (US)

(73) Assignee: EI ELECTRONICS LLC, Westbury, NY (US)

( * ) Notice: Subject to any disclaimer, the term of this patent is extended or adjusted under 35 U.S.C. 154(b) by 624 days.

(21) Appl. No.: 16/598,099

(22) Filed: Oct. 10, 2019

(65) Prior Publication Data

US 2020/0041307 A1 Feb. 6, 2020

Related U.S. Application Data

(63) Continuation of application No. 13/155,919, filed on Jun. 8, 2011, now abandoned, which is a continuation-in-part of application No. 11/589,381, filed on Oct. 30, 2006, now Pat. No. 8,442,660.

(60) Provisional application No. 61/352,613, filed on Jun. 8, 2010, provisional application No. 60/731,006, filed on Oct. 28, 2005.

(51) Int. Cl.
    *G01D 4/00* (2006.01)
(52) U.S. Cl.
    CPC .............. *G01D 4/004* (2013.01); *Y02B 90/20* (2013.01); *Y04S 20/30* (2013.01)
(58) Field of Classification Search
    CPC .......... G01D 4/004; Y04S 20/30; Y02B 90/20
    See application file for complete search history.

(56) References Cited

U.S. PATENT DOCUMENTS

| 3,623,087 A | 11/1971 | Gallichotte et al. |
| 3,903,380 A | 9/1975 | Schomburg |

(Continued)

FOREIGN PATENT DOCUMENTS

| CA | 2220053 A1 | 11/1996 |
| CN | 2537983 Y | 2/2003 |

(Continued)

OTHER PUBLICATIONS

Emerson Process Management, Using Modbus Protocol with Micro Motion Transmitters, Instruction Manual, P/N 3600219, Rev. B, Jul. 2002 (accessed at http://www.gommci.com/pdf/micro-motion-modbus-usage.pdf on Apr. 30, 2013) [Only pp. 2-5 included due to the large size of the original document].

(Continued)

*Primary Examiner* — Kyle R Quigley
(74) *Attorney, Agent, or Firm* — Robinson + Cole LLP

(57) ABSTRACT

An intelligent electronic device (IED) having a programmable display is provided. The present disclosure provides for defining screens of a display on a revenue based energy meter. The method utilizes Modbus registers and defines a programming technique wherein a user can custom make any desired screen for every application based on what a user needs. The programming utilizes Modbus registers maps to allow for the customizable screens. Moreover, the display interface allows for customized labeling to provide notice and information to users as to measured parameters other than electricity that the meter might be accumulating such as steam, water, gas or other type of commodity.

20 Claims, 14 Drawing Sheets

(56) References Cited

U.S. PATENT DOCUMENTS

| | | |
|---|---|---|
| 3,906,491 A | 9/1975 | Gosswiller et al. |
| 3,983,554 A | 9/1976 | Goode |
| 4,060,803 A | 11/1977 | Ashworth, Jr. |
| 4,415,896 A | 11/1983 | Allgood |
| 4,697,180 A | 9/1987 | Swanson |
| 4,697,182 A | 9/1987 | Swanson |
| 4,700,188 A | 10/1987 | James |
| 4,757,263 A | 7/1988 | Cummings, I et al. |
| 5,206,595 A | 4/1993 | Wiggins et al. |
| 5,426,688 A | 6/1995 | Anand |
| 5,438,607 A | 8/1995 | Przygoda, Jr. et al. |
| 5,469,365 A | 11/1995 | Diekema et al. |
| 5,475,557 A | 12/1995 | Larom et al. |
| 5,537,327 A | 7/1996 | Snow et al. |
| 5,600,524 A | 2/1997 | Neiger et al. |
| 5,650,936 A | 7/1997 | Loucks et al. |
| 5,661,658 A * | 8/1997 | Putt .................. G01R 13/02 340/461 |
| 5,661,802 A | 8/1997 | Nilssen |
| 5,684,710 A | 11/1997 | Ehlers et al. |
| 5,706,204 A | 1/1998 | Cox et al. |
| 5,719,564 A | 2/1998 | Sears |
| 5,736,847 A | 4/1998 | Doorn et al. |
| 5,764,155 A | 6/1998 | Kertesz et al. |
| 5,768,148 A | 6/1998 | Murphy et al. |
| 5,796,742 A | 8/1998 | Klotzbach et al. |
| 5,828,576 A | 10/1998 | Loucks et al. |
| 5,828,978 A | 10/1998 | Anand et al. |
| 5,838,589 A | 11/1998 | Nail et al. |
| 5,862,391 A | 1/1999 | Salas et al. |
| 5,963,406 A | 10/1999 | Neiger et al. |
| 5,982,596 A | 11/1999 | Spencer et al. |
| 5,995,911 A | 11/1999 | Hart |
| 6,000,034 A | 12/1999 | Lightbody et al. |
| 6,005,758 A | 12/1999 | Spencer et al. |
| 6,005,759 A | 12/1999 | Hart et al. |
| 6,043,642 A | 3/2000 | Martin et al. |
| D427,533 S | 7/2000 | Cowan et al. |
| D429,655 S | 8/2000 | Cowan et al. |
| 6,147,616 A | 11/2000 | Kim |
| D435,471 S | 12/2000 | Simbeck et al. |
| 6,157,527 A | 12/2000 | Spencer et al. |
| 6,185,508 B1 | 2/2001 | Doorn et al. |
| 6,186,842 B1 | 2/2001 | Hirschbold et al. |
| 6,195,243 B1 | 2/2001 | Spencer et al. |
| D439,535 S | 3/2001 | Cowan et al. |
| 6,212,049 B1 | 4/2001 | Spencer et al. |
| 6,219,046 B1 | 4/2001 | Thomas et al. |
| 6,236,949 B1 | 5/2001 | Hart |
| D443,541 S | 6/2001 | Hancock et al. |
| 6,297,742 B1 * | 10/2001 | Canada .................. G01R 31/343 318/490 |
| 6,366,301 B1 | 4/2002 | Thomas et al. |
| 6,377,283 B1 | 4/2002 | Thomas |
| 6,380,949 B2 | 4/2002 | Thomas et al. |
| 6,397,155 B1 | 5/2002 | Przydatek et al. |
| D458,863 S | 6/2002 | Harding et al. |
| D459,259 S | 6/2002 | Harding et al. |
| 6,421,214 B1 | 7/2002 | Packard et al. |
| 6,493,644 B1 | 12/2002 | Jonker et al. |
| 6,563,697 B1 | 5/2003 | Simbeck et al. |
| 6,567,404 B1 | 5/2003 | Wilford |
| 6,578,084 B1 | 6/2003 | Moberg et al. |
| 6,611,773 B2 | 8/2003 | Przydatek et al. |
| 6,611,922 B2 | 8/2003 | Ozcetin et al. |
| 6,615,147 B1 | 9/2003 | Jonker et al. |
| 6,636,030 B1 | 10/2003 | Rose et al. |
| 6,671,635 B1 | 12/2003 | Forth et al. |
| 6,671,654 B1 | 12/2003 | Forth et al. |
| 6,687,627 B1 | 2/2004 | Gunn et al. |
| 6,694,270 B2 | 2/2004 | Hart |
| 6,735,535 B1 | 5/2004 | Kagan et al. |
| 6,737,855 B2 | 5/2004 | Huber et al. |
| 6,745,138 B2 | 6/2004 | Przydatek et al. |
| 6,751,562 B1 | 6/2004 | Blackett et al. |
| 6,751,563 B2 | 6/2004 | Spanier et al. |
| 6,792,337 B2 | 9/2004 | Blackett et al. |
| 6,792,364 B2 | 9/2004 | Jonker et al. |
| 6,798,190 B2 | 9/2004 | Harding et al. |
| 6,798,191 B1 | 9/2004 | Macfarlane et al. |
| 6,813,571 B2 | 11/2004 | Lightbody et al. |
| 6,819,098 B2 | 11/2004 | Villicana et al. |
| 6,825,776 B2 | 11/2004 | Lightbody et al. |
| 6,853,978 B2 | 2/2005 | Forth et al. |
| 6,871,150 B2 | 3/2005 | Huber et al. |
| D505,087 S | 5/2005 | Ricci et al. |
| 6,894,979 B1 | 5/2005 | Lee |
| 6,901,299 B1 | 5/2005 | Whitehead et al. |
| 6,944,555 B2 | 9/2005 | Blackett et al. |
| 6,957,158 B1 | 10/2005 | Hancock et al. |
| 6,961,641 B1 | 11/2005 | Forth et al. |
| 6,983,211 B2 | 1/2006 | Macfarlene et al. |
| 6,988,025 B2 | 1/2006 | Ransom et al. |
| 6,988,182 B2 | 1/2006 | Teachman et al. |
| 6,990,121 B1 | 1/2006 | Stiles et al. |
| 6,990,395 B2 | 1/2006 | Ransom et al. |
| 7,006,934 B2 | 2/2006 | Jonker et al. |
| 7,010,438 B2 | 3/2006 | Hancock et al. |
| 7,072,779 B2 | 7/2006 | Hancock et al. |
| 7,085,824 B2 | 8/2006 | Forth et al. |
| 7,089,089 B2 | 8/2006 | Cumming et al. |
| 7,127,328 B2 | 10/2006 | Ransom |
| D532,747 S | 11/2006 | Ricci et al. |
| 7,135,988 B2 | 11/2006 | Kawai et al. |
| 7,136,384 B1 | 11/2006 | Wang |
| D534,120 S | 12/2006 | Ricci et al. |
| 7,155,350 B2 | 12/2006 | Kagan |
| 7,158,050 B2 | 1/2007 | Lightbody et al. |
| 7,174,258 B2 | 2/2007 | Hart |
| 7,174,261 B2 | 2/2007 | Gunn et al. |
| 7,184,904 B2 | 2/2007 | Kagan |
| 7,188,003 B2 | 3/2007 | Ransom et al. |
| 7,191,076 B2 | 3/2007 | Huber et al. |
| 7,216,043 B2 | 5/2007 | Ransom et al. |
| 7,246,014 B2 | 7/2007 | Forth et al. |
| 7,248,977 B2 | 7/2007 | Hart |
| 7,248,978 B2 | 7/2007 | Ransom |
| 7,249,265 B2 | 7/2007 | Carolsfeld et al. |
| 7,256,709 B2 | 8/2007 | Kagan |
| 7,262,709 B2 | 8/2007 | Borleske et al. |
| 7,271,996 B2 | 9/2007 | Kagan et al. |
| 7,294,997 B2 | 11/2007 | Kagan |
| 7,304,586 B2 | 12/2007 | Wang et al. |
| 7,305,310 B2 | 12/2007 | Slota et al. |
| 7,319,574 B2 | 1/2008 | Engel |
| 7,337,081 B1 | 2/2008 | Kagan |
| 7,415,725 B2 | 8/2008 | Henneberry et al. |
| 7,486,081 B2 | 2/2009 | Kalokitis et al. |
| 7,516,106 B2 | 4/2009 | Ehlers et al. |
| 7,535,687 B2 | 5/2009 | Costa |
| 7,561,926 B2 | 7/2009 | Garcia-Ortiz |
| 7,567,174 B2 | 7/2009 | Woodard et al. |
| 7,570,469 B2 | 8/2009 | Guzman-Casillas et al. |
| 7,576,635 B2 | 8/2009 | Bender et al. |
| 7,609,719 B2 | 10/2009 | Kagan et al. |
| 7,612,654 B2 | 11/2009 | Bender et al. |
| 7,616,656 B2 | 11/2009 | Wang et al. |
| 7,627,453 B2 | 12/2009 | Keefe et al. |
| RE41,871 E | 10/2010 | Capowski et al. |
| 7,982,600 B2 | 7/2011 | Gavrila et al. |
| 8,040,234 B2 | 10/2011 | Ebrom et al. |
| 8,107,491 B2 | 1/2012 | Wang et al. |
| 8,442,660 B2 | 5/2013 | Kagan |
| 9,322,669 B2 | 4/2016 | Kagan |
| 2001/0010032 A1 | 7/2001 | Ehlers et al. |
| 2002/0032535 A1 * | 3/2002 | Alexander .......... G01R 21/133 702/64 |
| 2002/0035497 A1 | 3/2002 | Mazereeuw et al. |
| 2002/0114326 A1 | 8/2002 | Mahalingaiah |
| 2002/0120723 A1 | 8/2002 | Forth et al. |
| 2002/0162014 A1 | 10/2002 | Przydatek et al. |
| 2002/0165677 A1 | 11/2002 | Lightbody et al. |
| 2002/0169570 A1 | 11/2002 | Spanier et al. |
| 2002/0191640 A1 | 12/2002 | Haymes et al. |

(56) References Cited

U.S. PATENT DOCUMENTS

| | | |
|---|---|---|
| 2003/0014200 A1 | 1/2003 | Jonker et al. |
| 2003/0040897 A1* | 2/2003 | Murphy .............. G05B 19/042 703/18 |
| 2003/0065459 A1 | 4/2003 | Huber et al. |
| 2003/0066311 A1 | 4/2003 | Li et al. |
| 2003/0067490 A1 | 4/2003 | Murakami |
| 2003/0076242 A1 | 4/2003 | Burns et al. |
| 2003/0084112 A1* | 5/2003 | Curray .............. H04L 9/40 709/224 |
| 2003/0085715 A1 | 5/2003 | Lubkeman et al. |
| 2003/0101008 A1 | 5/2003 | Hart |
| 2003/0105608 A1 | 6/2003 | Hart |
| 2003/0132742 A1 | 7/2003 | Harding et al. |
| 2003/0147420 A1 | 8/2003 | Beckwith |
| 2003/0154471 A1 | 8/2003 | Teachman et al. |
| 2003/0176952 A1 | 9/2003 | Collins et al. |
| 2003/0177440 A1 | 9/2003 | Kegoya et al. |
| 2003/0210699 A1 | 11/2003 | Holt et al. |
| 2003/0212512 A1 | 11/2003 | Hart |
| 2003/0220752 A1 | 11/2003 | Hart |
| 2004/0037313 A1 | 2/2004 | Gulati et al. |
| 2004/0066311 A1 | 4/2004 | Giles et al. |
| 2004/0138786 A1 | 7/2004 | Blackett et al. |
| 2004/0138787 A1 | 7/2004 | Ransom et al. |
| 2004/0138835 A1 | 7/2004 | Ransom et al. |
| 2004/0153594 A1* | 8/2004 | Rotvold ............. G05B 19/4186 710/305 |
| 2004/0172207 A1 | 9/2004 | Hancock et al. |
| 2004/0183522 A1 | 9/2004 | Gunn et al. |
| 2004/0229578 A1 | 11/2004 | Lightbody et al. |
| 2005/0002417 A1 | 1/2005 | Kelly et al. |
| 2005/0017874 A1 | 1/2005 | Lightbody et al. |
| 2005/0027464 A1 | 2/2005 | Jonker et al. |
| 2005/0039040 A1* | 2/2005 | Ransom ............. H04L 63/0272 700/286 |
| 2005/0049753 A1 | 3/2005 | Garcia-Ortiz |
| 2005/0071106 A1 | 3/2005 | Huber et al. |
| 2005/0093708 A1* | 5/2005 | Dupeire ............. H02G 1/00 340/664 |
| 2005/0114361 A1 | 5/2005 | Roberts et al. |
| 2005/0144437 A1* | 6/2005 | Ransom ............. G06F 1/28 700/286 |
| 2005/0222784 A1 | 10/2005 | Tuff et al. |
| 2005/0256964 A1 | 11/2005 | Dube et al. |
| 2005/0275397 A1 | 12/2005 | Lightbody et al. |
| 2005/0288876 A1 | 12/2005 | Doig et al. |
| 2005/0288877 A1 | 12/2005 | Doig et al. |
| 2006/0016201 A1 | 1/2006 | Kopel |
| 2006/0052958 A1 | 3/2006 | Hancock et al. |
| 2006/0071813 A1 | 4/2006 | Kagan |
| 2006/0077999 A1 | 4/2006 | Kagan et al. |
| 2006/0086893 A1 | 4/2006 | Spanier et al. |
| 2006/0158438 A1* | 7/2006 | Hunter ............. G06F 8/38 345/173 |
| 2006/0161400 A1 | 7/2006 | Kagan |
| 2006/0170409 A1 | 8/2006 | Kagan et al. |
| 2006/0187956 A1 | 8/2006 | Doviak et al. |
| 2006/0230394 A1 | 10/2006 | Forth et al. |
| 2006/0238364 A1 | 10/2006 | Keefe et al. |
| 2006/0271244 A1 | 11/2006 | Cumming et al. |
| 2007/0038394 A1 | 2/2007 | Gagnon et al. |
| 2007/0067119 A1 | 3/2007 | Loewen et al. |
| 2007/0067121 A1 | 3/2007 | Przydatek et al. |
| 2007/0096942 A1 | 5/2007 | Kagan et al. |
| 2007/0136010 A1 | 6/2007 | Gunn et al. |
| 2008/0046205 A1 | 2/2008 | Gilbert et al. |
| 2008/0065335 A1 | 3/2008 | Doig et al. |
| 2008/0077336 A1 | 3/2008 | Fernandes |
| 2008/0088475 A1* | 4/2008 | Martin ............. G01R 22/066 340/870.02 |
| 2008/0154523 A1 | 6/2008 | Gilbert et al. |
| 2009/0096654 A1 | 4/2009 | Zhu et al. |
| 2009/0199084 A1 | 8/2009 | Motohashi |
| 2009/0235156 A1 | 9/2009 | Wake et al. |
| 2010/0046545 A1 | 2/2010 | Kagan et al. |
| 2011/0040809 A1* | 2/2011 | Spanier ............. G06F 16/10 707/821 |

FOREIGN PATENT DOCUMENTS

| | | |
|---|---|---|
| GB | 1438271 A | 6/1976 |
| GB | 2317278 A | 3/1998 |
| WO | 8707993 A1 | 12/1987 |
| WO | 0237653 A2 | 5/2002 |
| WO | 03003326 A1 | 1/2003 |
| WO | 2006047583 A2 | 5/2006 |

OTHER PUBLICATIONS

Modbus FAQ: About the Modbus Organization, (accessed at http://www.modbus.org/faq.php as it existed on Oct. 22, 2005 through the Internet Archive Wayback Machine at http://web.archive.org/web/20050801000000*/http://www.modbus.org/faq.php).

Xu Hong, Wang Jianhua, "An Extendable Data Engine based on OPC Specificatin"; Computer Standards & Interfaces 26 (2004) 515-525; Dec. 5, 2003.

* cited by examiner

| # title lines | # data lines | | | | |
|---|---|---|---|---|---|
| | 1 | 2 | 3 | 4 | 5 |
| 0 | Y | Y | Y | Y | Y |
| 1 | Y | Y | Y | Y | N |
| 2 | Y | Y | Y | N | N |

Fcode Table

| F number | Description | Raw Conversion: RTU amps, volts, pwr, freq (2 bits) | BCD | div by 100 | div by 65536 | signed entity | Numeric Transform: mult by user factor | mult by PT ratio | mult by CT ratio | Formatting: scale | num digits & dec pt position | text | PF (per peet PF method choice) | timestamp mm/dd/yy hh:mm:ss | status (OK or NOT OK) | Options: force negative | force positive | show sign |
|---|---|---|---|---|---|---|---|---|---|---|---|---|---|---|---|---|---|---|
| 1 | Null Terminated ASCII String | | | | | | | | | | | X | | | | | | |
| 2 | Fixed Length ASCII String | | | | | | | | | | | X | | | | | | |
| 3 | Time Stamp | | | | | | | | | | | | | X | | | | |
| 4 | Day of Week | | | | | | | | | | | | | | | | | |
| 5 | Secondary 1 Cycle RMS Voltage or Current | | | | | | | | | | | | | | | | | |
| 6 | High Speed Input Delta and Current State | | | | | | | | | | | | | | | | | |
| 7 | Secondary Voltage, Current, VA, VAR, etc. | | | X | X | | X | X | X | X | | | | | | | | X |
| 8 | Power Factor | | | | | | | | | | | | X | | | | | |
| 9 | Angle | | X | | X | | | | | | X | | | | | | | X |
| 10 | Percentage, alone | | X | | X | | | | | | X | | | | | | | X |
| 10 | Percentage, of something | | X | | X | X | | | | X | X | | | | | | | X |
| 11 | Energy Counter (Packed BCD / Secondary) | | X | | | | | | | | X | X | | | | | X | X |
| 12 | Energy Counter (Binary / Secondary) | | | | | | | | | | X | X | | | | | X | X |
| 13 | Phase Sequence | | | | | | | | | | | | | | | | | |
| 14 | Average Status | | | | | | | | | | | | | | X | | | |
| 15 | Limit States | | | | | | | | | | | | | | | | | |
| 16 | Low Speed Input States | | | | | | | | | | | | | | | | | |
| 17 | External Digital Input States | | | | | | | | | | | | | | | | | |
| 18 | External Input Accumulations | | | | | | X | X | | | | | | | | | | |
| 19 | Energy Counter (Packed BCD / Primary) | | X | | | | | | | | X | X | | | | | X | X |
| 20 | Energy Counter (Binary / Primary) | | | | | | | | | | X | X | | | | | X | X |
| 21 | Year | | | | | | | | | | | | | | | | | |
| 22 | TOU Profile per Day | | | | | | | | | | | | | | | | | |
| 23 | TOU Profile Status | | | | | | | | | | | | | | | | | |
| 24 | TOU daily Profile Register Assignment | | | | | | | | | | | | | | | | | |
| 25 | TOU Profile Monthly End Day | | | | | | | | | | | | | | | | | |
| 26 | TOU Calendar DST Enable / Average Selection | | | | | | | | | | | | | | | | | |
| 27 | TOU Upload Calendar Window Seq / Status | | | | | | | | | | | | | | | | | |
| 28 | TOU Upload Calendar Window ID | | | | | | | | | | | | | | | | | |
| 29 | TOU Upload Calendar Window Data | | | | | | | | | | | | | | | | | |
| 30 | TOU Upload Calendar Window Checksum | | | | | | | | | | | | | | | | | |
| 31 | TOU Calendar Selection | | | | | | | | | | | | | | | | | |
| 32 | TOU Calendar Header Status / Year Status | | | | | | | | | | | | | | | | | |
| 33 | Temperature | | X | | X | | | | | | X | | | | | | | X |
| 34 | Limit and Relay Logic States | | | | | | | | | | | | | | | | | |
| 35 | Relay Delays | | | | | | | | | | | | | | | | | |
| 36 | Desired Relay States | | | | | | | | | | | | | | | | | |
| 37 | Relays Pending Update | | | | | | | | | | | | | | | | | |
| 38 | Shadowed Relay States | | | | | | | | | | | | | | | | | |
| 39 | Confirmed Polled Relay States | | | | | | | | | | | | | | | | | |
| 40 | Valid Flags for Confirmed Relay States | | | | | | | | | | | | | | | | | |
| 41 | Locked Relays, Relays 1-16 | | | | | | | | | | | | | | | | | |
| 42 | Locked Relay States | | | | | | | | | | | | | | | | | |
| 43 | Miscellaneous Flags | | | | | | | | | | | | | | | | | |
| 44 | Digital Input Module Data Status | | | | | | | | | | | | | | | | | |
| 45 | Analog Input Modules Data Status | | | | | | | | | | | | | | | | | |
| 46 | High Byte of Modbus Register (Signed) | | | | | X | X | | | X | X | | | | | | | X |
| 47 | High Byte of Modbus Register (Unsigned) | | | | | | X | | | X | X | | | | | | | X |
| 48 | Low Byte of Modbus Register (Signed) | | | | | X | X | | | X | X | | | | | | | X |
| 49 | Low Byte of Modbus Register (Unsigned) | | | | | | X | | | X | X | | | | | | | X |
| 50 | Two-Byte (Signed) | | X | X | X | X | X | X | X | X | X | | | | | | | X |
| 51 | Two-Byte (Unsigned) | | | | | | X | X | X | X | X | | | | | | | X |
| 52 | Four-Byte (Signed) | | X | X | X | | | | | X | X | | | | | | | X |
| 53 | Four-Byte (Unsigned) | | | | | | | | | X | X | | | | | | | X |
| 54 | Eight-Byte (Signed) | | X | X | | | | | | X | X | | | | | | | X |
| 55 | Eight-Byte (Unsigned) | | | | | X | | | | X | X | | | | | | | X |
| 56 | Flicker Countdowns | | | | | | X | | | | X | | | | | | | |
| 57 | Accumulation in the Interval | | | | | | X | X | X | X | X | | | | | X | | |
| 58 | 12-Bit RTU Sanity Register | | | | | | | | | | | | | | X | | | |
| 59 | 12-Bit RTU Current, Voltage, W, VAR | X | | | | | | X | X | X | X | | | | | | | X |
| 60 | Energy Counter | | | | | | | | | | | | | | | | | |
| 61 | 12-bit RTU Frequency | X | | | | | | | | | X | | | | | | | |
| 62 | Scaled Pulse Accumulation, Aggregation, Avg | | | | | | | | | X | X | | | | | | | |
| 63 | Log Index | | | | | | | | | | | | | | | | | |
| 64 | Scaled Energy | | | | | X | | | | X | X | | | | | | | X |
| 65 | Scaled Energy Setting | | | | | | | | | | | | | | | | | |
| 66 | TOU Upload Calendar Window Locked to Port | | | | | | | | | | | | | | | | | |
| 67 | K-Factor | | X | | X | | | | | | X | | | | | | | X |

FIG. 10

| Byte | Layout 0 | Layout 1 | Layout 2 | Layout 3 | Layout 4 | Layout 5 | Layout 6 | Layout 7 |
|---|---|---|---|---|---|---|---|---|
| 0 - 1 | user screen number | user screen number | user screen number | user screen number | user screen number | user screen number | user screen number | user screen number |
| 2 | Layout Number = 0 | Layout Number = 1 | Layout Number = 2 | Layout Number = 3 | Layout Number = 4 | Layout Number = 5 | Layout Number = 6 | Layout Number = 7 |
| 3 | old screen # | title 1 (16 chars) | title 1 (16 chars) | title 1 (16 chars) | title 1 (16 chars) | title 1 (16 chars) | unused (16 chars) | title 1 (16 chars) |
| 4 | old screen modifier | | | | | | | |
| 5 - 18 | | | | | | | | |
| 19 - 34 | | title 2 | title 2 | title 2 | title 2 | unused | unused | title2 |
| 35 | | suffix (2 chars) | raw conversion | raw conversion | raw conversion | raw conversion | raw conversion | raw conversion |
| 36 | | | | | | | | |
| 37 | | prefix 1 (3 chars) | numeric transform | numeric transform | numeric transform | numeric transform | numeric transform | numeric transform |
| 38 | | | | | | | | |
| 39 | | | | | | | | |
| 40 | | prefix 2 (3 chars) | format (3 chars) | format (3 chars) | format (3 chars) | format (3 chars) | format (3 chars) | format (3 chars) |
| 41 | | | | | | | | |
| 42 | | | format options | format options | format options | format options | format options | format options |
| 43 | | prefix 3 (3 chars) | | | | | | |
| 44 | | | | | | | | |
| 45 | | | multiplier (5 chars) | multiplier (5 chars) | multiplier (5 chars) | multiplier (5 chars) | multiplier (5 chars) | multiplier (5 chars) |
| 46 | | prefix 4 (3 chars) | | | | | | |
| 47 | | | | | | | | |
| 48 | | | | | | | | |
| 49 | | prefix 5 (3 chars) | suffix (2 chars) | suffix (2 chars) | suffix (2 chars) | suffix (2 chars) | suffix (2 chars) | entity size |
| 50 | | | | | | | | 1st entity's register |
| 51 | | | entity size | entity size | entity size | entity size | entity size | |
| 52 | | old screen # | prefix 1 (3 chars) | prefix 1 (3 chars) | prefix 1 (3 chars) | prefix 1 (3 chars) | prefix 1 (3 chars) | timestamp's register |
| 53 | | old screen modifier | | | | | | |
| 54 | | | | | | | | status register |
| 55 | | | 1st entity's register | prefix 2 (3 chars) | prefix 2 (3 chars) | prefix 2 (3 chars) | prefix 2 (3 chars) | |
| 56 | | | | | | | | |
| 57 | | | | | | | | |
| 58 | | | | 1st entity's register | prefix 3 (3 chars) | prefix 3 (3 chars) | prefix 3 (3 chars) | |
| 59 | | | | | | | | |
| 60 | | | | 2nd entity's register | | | | |
| 61 | | | | | 1st entity's register | prefix 4 (3 chars) | prefix 4 (3 chars) | |
| 62 | | | | | | | | |
| 63 | | | | | 2nd entity's register | | | |
| 64 | | | | | | 1st entity's register | prefix 5 (3 chars) | |
| 65 | | | | | 3rd entity's register | | | |
| 66 | | | | | | 2nd entity's register | | |
| 67 | | | | | | | 1st entity's register | |
| 68 | | | | | | 3rd entity's register | | |
| 69 | | | | | | | 2nd entity's register | |
| 70 | | | | | | 4th entity's register | | |
| 71 | | | | | | | 3rd entity's register | |
| 72 | | | | | | | | |
| 73 | | | | | | | 4th entity's register | |
| 74 | | | | | | | | |
| 75 | | | | | | | 5th entity's register | |
| 76 | | | | | | | | |

FIG. 11

ELECTRONIC POWER METER HAVING AN END USER CUSTOMIZABLE DISPLAY

This application is a continuation application of U.S. application Ser. No. 13/155,919, filed Jun. 8, 2011, which is a continuation-in-part application of U.S. application Ser. No. 11/589,381, filed Oct. 30, 2006, entitled "INTELLIEGNT ELECTRONIC DEVICE HAVING AUDIBLE AND VISUAL INTERFACE", which claims priority on U.S. Provisional Patent Appl. No. 60/731,006, filed Oct. 28, 2005, the content of which are hereby incorporated by reference in their entities.

U.S. application Ser. No. 13/155,919 also claims priority on U.S. Provisional Patent Appl. No. 61/352,613, filed Jun. 8, 2010, entitled "INTELLIGENT ELECTRONIC DEVICE HAVING A PROGRAMMABLE DISPLAY", the content of which is hereby incorporated by reference in its entirety.

BACKGROUND

1. Field of the Invention

The present disclosure relates generally to intelligent electronic devices for electrical power systems, and more particularly, to an intelligent electronic device (IED) having a programmable display. The present disclosure provides for defining screens of a display on a revenue based energy meter. The method utilizes Modbus registers and defines a programming technique wherein a user can custom make any desired screen for every application based on what a user needs. The programming utilizes Modbus registers maps to allow for the customizable screens.

2. Description of the Related Art

Electric utility companies ("utilities") track electric usage by customers by using power meters. These meters track the amount of power consumed at a particular location. These locations range from power substations, to commercial businesses, to residential homes. The electric utility companies use information obtained from the power meter to charge its customers for their power consumption, i.e. revenue metering.

A popular type of power meter is the socket-type power meter, i.e., S-base or Type S meter. As its name implies, the meter itself plugs into a socket for easy installation, removal and replacement. Other meter installations include panel mounted, switchboard mounted, and circuit breaker mounted. Additional meter forms include switchboard drawout forms, substation panel metering forms, and A-base front wired forms. Typically the power meter connects between utility power lines supplying electricity and a usage point, namely a residence or commercial place of business. All the forms are used for similar purposes and are in need of visual and audible alarms.

A power meter may also be placed at a point within the utility's power grid to monitor power flowing through that point for distribution, power loss, or capacity monitoring, e.g., a substation. These power and energy meters are installed in substations to provide a visual display of real-time data and to alarm when problems occur. These problems include limit alarms, breaker control, outages and many other types of events. Conventionally, the visual display includes numerical information and/or an alarm indication, e.g., a LED, on the face of the meter.

All power utilities use revenue meters to bill customers for their power usage. The issue in the United States is that every jurisdiction has a separate regulatory body commonly referred to as a Public Service Commission or similar type name. These regulatory bodies have many differing types of regulation concerning how customers should be billed by a utility. Since there are 50 states, there are multitudes of configuration requirements for which each regulatory body.

These requirements include different methods and type of screens that need to be on a revenue meter and even what order the screens must be displayed in. Moreover, each utility company itself also has its requirements and guidelines concerning specifics for the meters.

Therefore, a need exists for techniques for defining a user interface, e.g., screens of a display of an intelligent electronic device (IED) such a revenue meter, which is programmable or customizable by an end user to meet requirements of various regulatory bodies.

SUMMARY

An intelligent electronic device (IED), e.g., an electrical revenue meter, having a programmable display is provided. The techniques of the present disclosure allows a user to custom make any desired screen of a display in a revenue meter based upon any Modbus register available in the meter, i.e., any measured reading that the IED measures. In addition, the user can modify the Modbus register to add custom scaling and/or formulas to allow a user to create any desired number out of the data from the register. This expands the functionality of the display to having any capability either a user or a regulatory body can conceive of. Moreover, the display or interface allows for customized labeling to provide notice and information to users as to measured parameters other than electricity that the meter might be accumulating such as steam, water, gas or other type of commodity.

In one embodiment of the present disclosure, a user will program the screens of the display using a PC computer and then download the screen files to the IED over a network or by direct connection. In one aspect, the intelligent electronic device includes a communication device configured for communicating over the network to a programming device such a PC computer. In this embodiment, the communication device communicates via Transmission Control Protocol/Internet Protocol (TCP/IP), File Transfer Protocol (FTP), Hypertext Transfer Protocol (HTTP), Internet Protocol Security Protocol (IPSec), Point-to-Point Tunneling Protocol (PPTP) or Secure Sockets Layer (SSL) Protocol.

The above and other aspects, features, and advantages of the present disclosure will become more apparent in light of the following detailed description when taken in conjunction with the accompanying drawings.

BRIEF DESCRIPTION OF THE DRAWING

FIG. 10 is a table illustrating data available in the IED that can be displayed in accordance with the present disclosure;

FIG. 11 is a table illustrating screen layout definitions in accordance with the present disclosure;

DETAILED DESCRIPTION OF THE PREFERRED EMBODIMENTS

Figure 1:
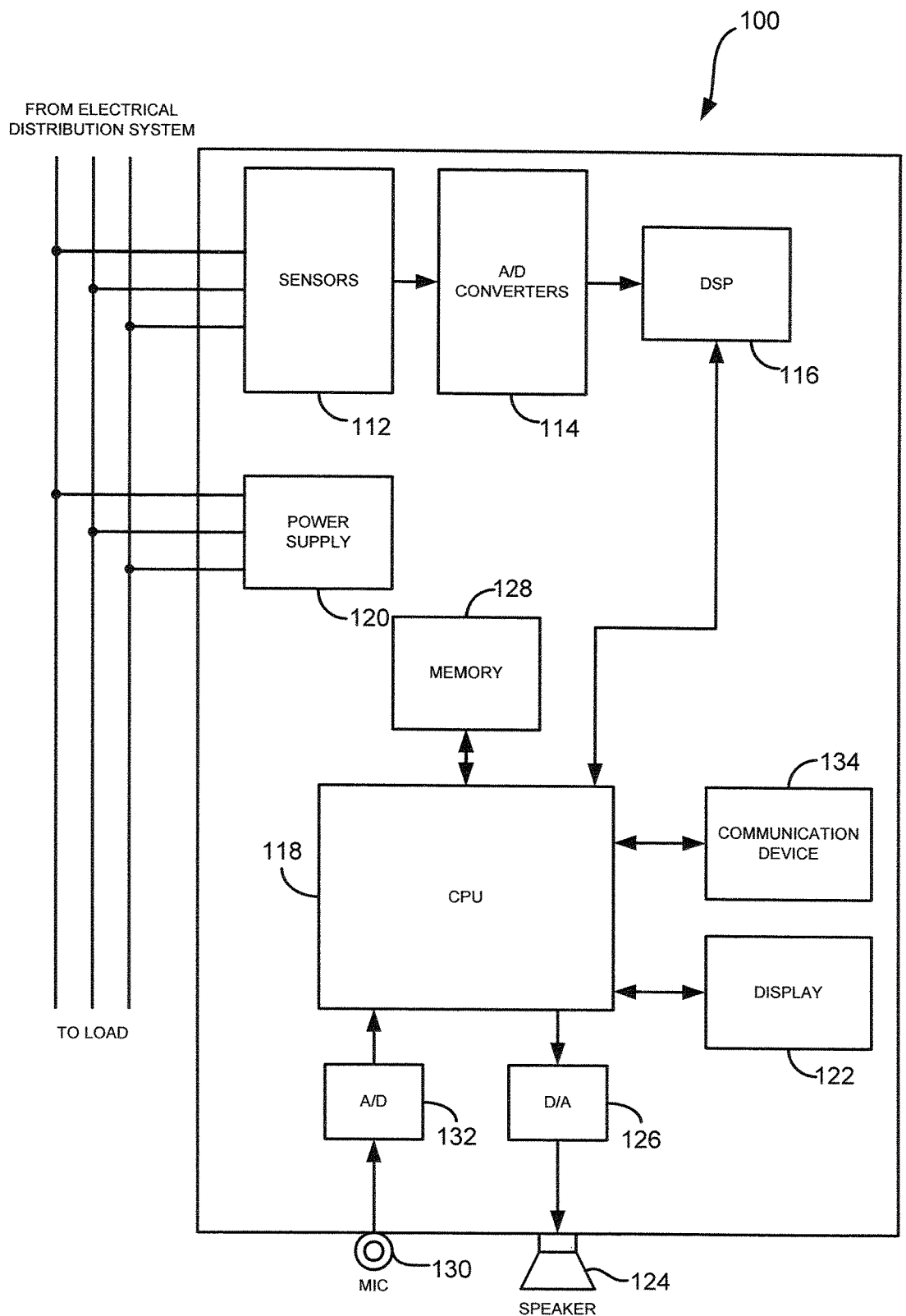
FIG. 1 is a diagram of an intelligent electronic device in accordance with an embodiment of the present disclosure.

Preferred embodiments of the present disclosure will be described herein below with reference to the accompanying drawings. In the following description, well-known functions or constructions are not described in detail to avoid obscuring the present disclosure in unnecessary detail.

As used herein, intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. Exemplary intelligent electronic devices are disclosed and described in the following commonly owned U.S. issued patents and published applications: U.S. patent application Ser. No. 10/146,339 entitled "METER WITH IRDA PORT" filed on May 15, 2002; U.S. patent application Ser. No. 10/958,456 entitled "METER HAVING A COMMUNICATION INTERFACE FOR RECEIVING AND INTERFACING WITH A COMMUNICATION DEVICE" filed on Oct. 5, 2004; U.S. patent application Ser. No. 11/087,438 entitled "SYSTEM AND METHOD FOR SIMULTANEOUS COMMUNICATION ON MODBUS AND DNP 3.0 OVER ETHERNET FOR ELECTRONIC POWER METER" filed on Mar. 23, 2005; U.S. patent application Ser. No. 11/109,351 entitled 'SYSTEM AND METHOD FOR COMPENSATING FOR POTENTIAL AND CURRENT TRANSFORMERS IN ENERGY METERS" filed on Apr. 18, 2005; U.S. patent application Ser. No. 11/039,316 entitled "MULTIPLE ETHERNET PORTS ON POWER METER" filed on Jan. 19, 2005; U.S. patent application Ser. No. 11/003,064 entitled "CURRENT INPUTS INTERFACE FOR AN ELECTRICAL DEVICE" filed on Dec. 3, 2004; U.S. patent application Ser. No. 11/042,588 entitled "SYSTEM AND METHOD FOR CONNECTING ELECTRICAL DEVICES USING FIBER OPTIC SERIAL COMMUNICATION" filed on Jan. 24, 2005; U.S. Design Pat. No. D525,893 entitled "ELECTRONIC POWER METER" issued on Aug. 1, 2006; U.S. patent application Ser. No. 11/091,254 entitled "SYSTEM AND METHOD FOR PROVIDING UNIVERSAL ADDITIONAL FUNCTIONALITY FOR POWER METERS" filed on Mar. 28, 2005; U.S. patent application Ser. No. 11/341,802 entitled "METERING DEVICE WITH CONTROL FUNCTIONALITY AND METHOD THEREOF" filed on Jan. 27, 2006; U.S. Design patent application No. 29/224,737 entitled "WALL MOUNT ASSEMBLY" filed on Mar. 7, 2005; U.S. Design Pat. No. D526,920 entitled "ELECTRONIC METER" issued on Aug. 22, 2006; U.S. patent Continuation-in-Part application Ser. No. 11/317,227 entitled "TEST PULSES FOR ENABLING REVENUE TESTABLE PANEL METERS" filed on Dec. 22, 2005; U.S. Pat. No. 6,735,535 entitled "POWER METER HAVING AN AUTO-CALIBRATION FEATURE AND DATA ACQUISITION CAPABILITIES" issued on May 11, 2004; U.S. Pat. No. 6,636,030 entitled "REVENUE GRADE METER WITH HIGH-SPEED TRANSIENT DETECTION" issued on Oct. 21, 2002; U.S. Pat. No. 6,751,563 entitled "ELECTRONIC POWER METER" issued on Jun. 15, 2004; U.S. patent application Ser. No. 10/896,489 entitled "SYSTEM AND METHOD UTILIZING VIRTUAL SWITCHING FOR ELECTRIC PANEL METERING" filed on Jul. 22, 2004; U.S. patent application Ser. No. 10/896,521 entitled "ELECTRICAL METER INSTALLATION SYSTEM AND METHOD" filed on Jul. 22, 2004; U.S. patent application Ser. No. 10/969,713 entitled "TEST PULSES FOR ENABLING REVENUE TESTABLE PANEL METERS" filed on Oct. 20, 2004; U.S. patent application Ser. No. 10/969,592 entitled "SYSTEM AND METHOD FOR PROVIDING COMMUNICATION BETWEEN INTELLIGENT ELECTRONIC DEVICES VIA AN OPEN CHANNEL" filed on Oct. 20, 2004; and U.S. patent application Ser. No. 10/969,706 entitled "ON-LINE WEB ACCESSED ENERGY METER" filed on Oct. 20, 2004, the contents of all of which are hereby incorporated by reference in their entireties.

An intelligent electronic device (IED) 100 for monitoring and determining an amount of electrical power usage by a consumer and for providing audible and visual indications to a user is illustrated in FIG. 1. Generally, the IED 100 includes sensors 112, a plurality of analog-to-digital (A/D) converters 114 and a processing system including a central processing unit (CPU) 118 and/or a digital signal processor (DSP) 116. The sensors 112 will sense electrical parameters, e.g., voltage and current, of the incoming lines from an electrical power distribution system, e.g., an electrical circuit. Preferably, the sensors will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 114 configured to convert the analog output voltage from the transformer to a digital signal that can be processed by the CPU 18 or DSP 116.

The CPU 18 is configured for receiving the digital signals from the A/D converters 114 to perform the necessary calculations to determine the power usage and controlling the overall operations of the IED 100. In another embodiment, the DSP 116 will receive the digital signals from the A/D converters 114 and perform the necessary calculations to determine the power usage to free the resources of the CPU 118. It is to be appreciated that in certain embodiments the CPU 118 may perform all the functions performed by the CPU 118 and DSP 116, and therefore, in these embodiments the DSP 116 will not be utilized.

A power supply 120 is also provided for providing power to each component of the IED 100. In one embodiment, the power supply 120 is a transformer with its primary windings coupled to the incoming power distribution lines and having an appropriate number of windings to provide a nominal voltage, e.g., 5 VDC, at its secondary windings. In other embodiments, power is supplied from an independent source to the power supply 120, e.g., from a different electrical circuit, a uninterruptible power supply (UPS), etc.

The IED 100 of the present disclosure will have user interface for interacting with a user and for communicating events, alarms and instructions to the user. The user interface will include a display 122 for providing visual indications to the user. The display 122 may include a touch screen, a liquid crystal display (LCD), a back-lit LCD, a plurality of LED number segments, individual light bulbs or any combination of these or any other know display device. The display 122 may provide the information to the user in the form of alpha-numeric lines, computer-generated graphics, videos, etc. Visual information provided on the display 122 may include but is not limited to instructional videos, operating manuals associated with an IED, a flowchart for troubleshooting, a checklist for troubleshooting, etc. Digital files including the various visual instructions are stored in either memory 128 or retrieved from a remote event server.

The user interface will also include an audible output device 124, e.g., a speaker. The speaker 124 will be coupled to the CPU 118 via a digital-to-analog converter (D/A) 126 for converting digital audio files stored in memory 128 to analog signals playable by the speaker 122. The audible output device 124 may simply provide audible instructions to a user when an event is detected or may provided audio with a corresponding video being displayed on the display 122.

The device 100 of the present disclosure will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The memory 128 is configured for storing the files including the visual and/or audible instructions. The memory 128 is further configured for storing any values measured or calculated by the IED. The memory 128 includes internal storage memory, e.g., random access memory (RAM), or removable memory such as magnetic storage memory; optical storage memory, e.g., the various known types of CD and DVD media; solid-state storage memory, e.g., a Compact-Flash card, a Memory Stick, SmartMedia card, MultiMediaCard (MMC), SD (Secure Digital) memory; or any other memory storage that exists currently or will exist in the future. By utilizing removable memory, an IED can be easily upgraded with new instruction files as needed.

In one embodiment, the memory 128 stores screen layout configurations for providing a screen display on the display 122. In certain embodiments, the screen layout configurations include a first look-up table for determining a relationship between data placeholders on a screen layout and a Modbus map and a second look-up table for determining a relationship between the Modbus map and a location in memory of stored data, the details of which will be described below.

Figure 2:
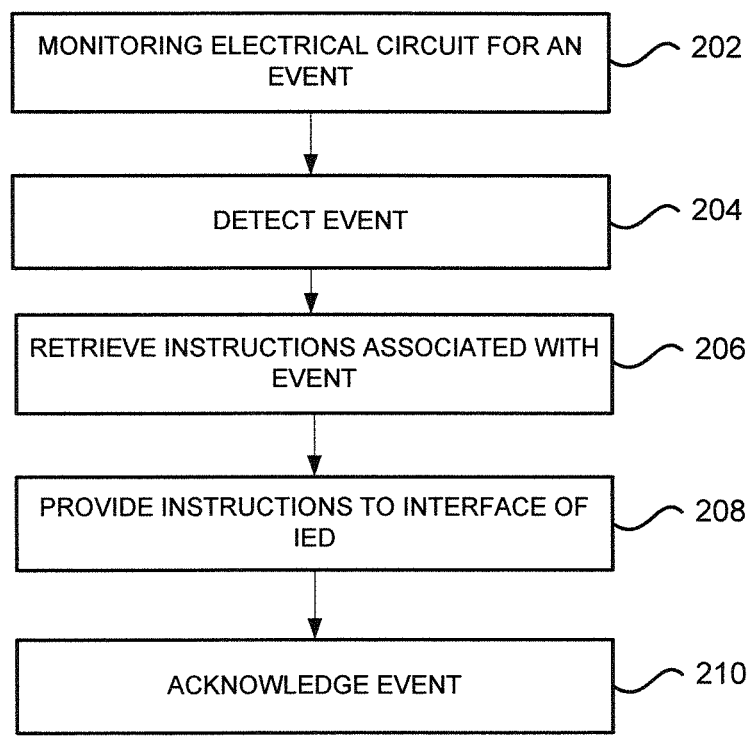
FIG. 2 is a flow chart illustrating a method for providing instructions to an intelligent electronic device in accordance with an embodiment of the present disclosure.
Figure 3:
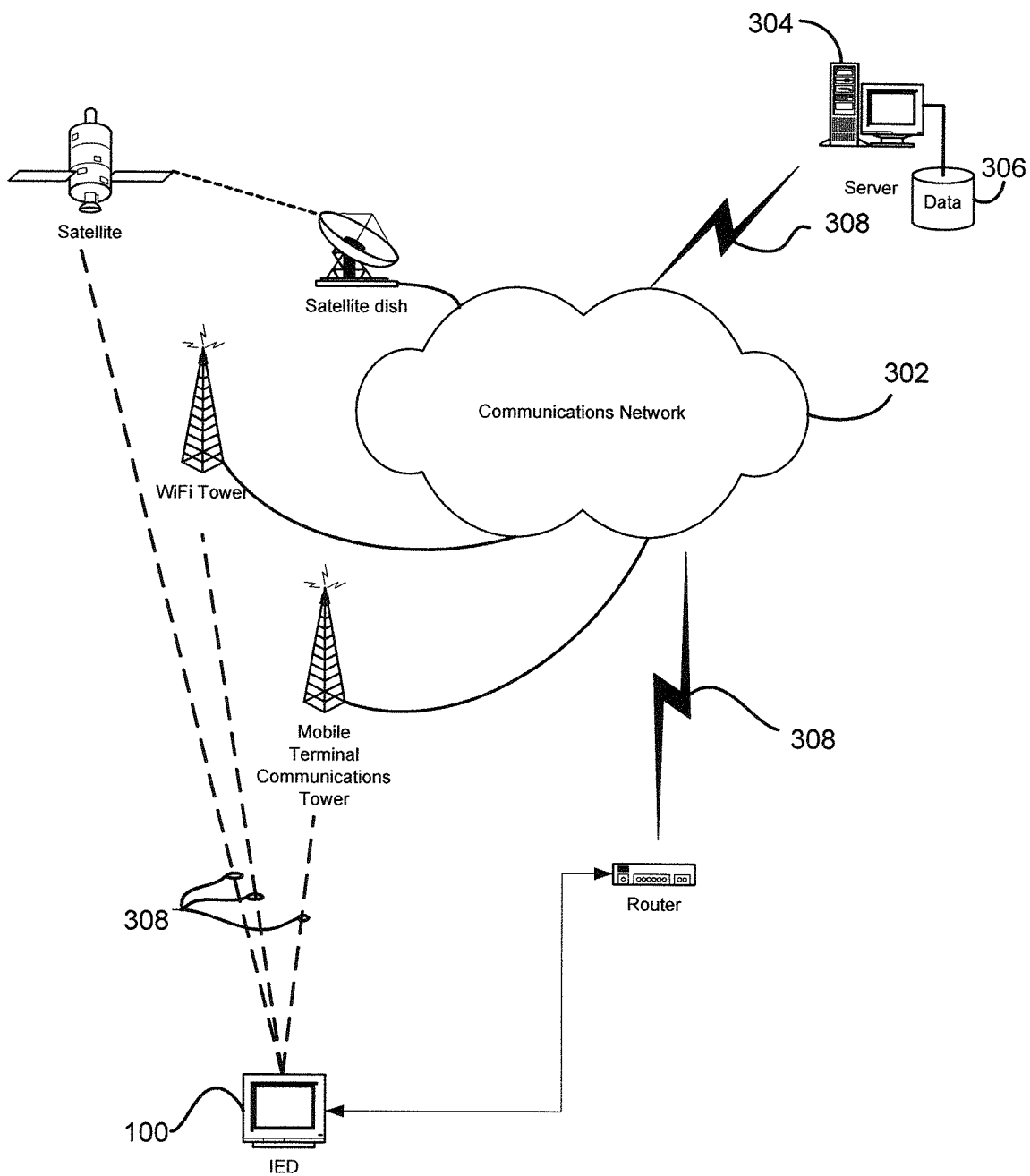
FIG. 3 is a system for retrieving instruction for an intelligent electronic device in accordance with an embodiment of the present disclosure.

Referring to FIG. 2, operations of the IED 100 will be described. Generally, the IED 100 monitors an electrical circuit and measures power parameters, e.g., voltage and current (step 202). The CPU 118 will be programmed upon detecting certain events (step 204), e.g., an alarm condition, a trouble condition, to retrieve one of a plurality of stored digital files, e.g., predetermined instructions, from memory 128 associated to the detected event (step 206). In memory 128, each event will associated with a file including instructions for the specific event. In one embodiment, each event will be assigned an event code and the event code will be utilized to retrieve an instruction file. In this manner if two different events utilize the same instruction file, only one instruction file will be stored in memory thus reducing the size of the memory.

The retrieved digital file will then be sent to the interface for providing instructions, e.g., on how to rectify the problem, to a user (step 208). Depending on the type of file retrieved, the file will be sent to the appropriate interface component. For example, a digital audio file is sent to the D/A 126 to convert the digital signals to analog signals, which will subsequently be sent to the speaker 124. As a further example, a text file (e.g., a word processing document or PDF file) or video file (e.g., mpeg file) will be sent to the display 122.

Upon occurrence of an event, the CPU 118 may display an indication that an event had occurred along with an audible indication to alert operators in the vicinity of the IED that an event has occurred. The audible indication may be a beep, tone or a voice spoken indication. It is to be appreciated different alarm indications may be associated to different types of alarms so a user may readily discern what type of alarm has occurred once it has been initiated.

In one embodiment, the user will be able to acknowledge or silence the alarm at the IED via a button, touchpad, touch screen, etc. (step 210). After the alarm has been silenced, the IED 100 may be programmed to audibly give instructions to the user, for example, in how to rectify the alarm or the location of the alarm. Furthermore, the IED 100 may display visual steps on the display 122 in conjunction with the spoken instructions, e.g., a flowchart, checklist, etc.

In one embodiment, the digital audio files may be programmed directly through the IED 10. In this embodiment, the IED 100 will include an audio input device 130, e.g., a microphone, for receiving spoken words in the form of analog signals. The analog signals will then be sent to an analog-to-digital converter (A/D) 132 to convert the analog signals into digital signals understandable by the CPU 118. The CPU 118 will then store the recorded digital audio file in the memory 128. The user may associate the recorded digital file with a particular alarm through the touch screen display 122. Alternatively, the user may associate the recorded digital file with an event code.

In a further embodiment, the IED 100 will include a communication device 134 for enabling communications between the IED 100 and other computing devices, e.g., a desktop computer, laptop computer, other IEDs, etc. The communication device 134 may be a modem, network interface card (NIC), wireless transceiver, etc. The communication device 134 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data.

The IED 100 will communicate to a server 304 via a communication network 302. The IED 100 and server 304 may be connected to the communications network 302, e.g., the Internet, by any known means, for example, a hardwired or wireless connection 308, such as dial-up, hardwired, cable, DSL, satellite, cellular, PCS, wireless transmission (e.g., 802.11a/b/g), etc. It is to be appreciated that the network 302 may be a local area network (LAN), wide area network (WAN), the Internet or any known network that couples a plurality of computers to enable various modes of communication via network messages. Furthermore, the server 304 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The server 304 will further include a storage medium 306 for storing a database of instructional videos, operating manuals, etc., the details of which will be described in detail below.

In this embodiment, the digital audio and/or video files, e.g., instruction files, may be recorded on a remote server 304 and downloaded to the IED 100 via the communication device 134 over a network, e.g., the Internet. In one embodiment, the server 304 includes a database 306 of predetermined instruction files which may be downloaded to the IED 100 and stored in the memory 128 upon an event command issued by a user, on a schedule or by triggered by the IED 100. In another embodiment, upon each detection of an event, the IED 100 will transmit to the server 304 an event code and the server 304 will return an instruction file associated to the event code. In this embodiment, the instruction files will be maintained in one location ensuring all available IEDs 100 in a network will access the most up-to-date instructions.

It is to be appreciated that any known or to be developed digital audio and/or visual format may be employed in the IED of the present disclosure, e.g., MP3, WMA (Windows Media Audio), WAV, Real Audio, MIDI, etc. Furthermore, the remote server 204 will include a plurality of digital file converters for converting the digital files in database 206 from any available format to a format compatible with the IED.

In a further embodiment, microphone 106 and speaker 124 are further coupled to the communication device 134 for enabling voice communication from the IED to a remote location. In one embodiment, the communication device 134 will enable voice communications with VoIP (Voice over Internet Protocol) or may include a mobile communications module operating on CDMA, PCS, GSM or any other known wireless communication technology.

It is to be appreciated that the communication device 134 may include a single integrated circuit chip to perform data transfer and voice communications or a single module including a separate data transfer chip, e.g., a WiFi transceiver, and a separate voice communication chip, e.g., a CDMA chip. In one embodiment, the communication device 134 will operate on the wireless GPRS (General Packet Radio Service) data protocol or a 3G protocol such as W-CDMA, CDMA2000 and TD-SCDMA. Both the GPRS and 3G protocols have the ability to carry both voice and data over the same service.

In this embodiment, when an event is detected, an operator at the location of the IED 100 may communicate with a remote operator, e.g., a technical support operator, for facilitating the rectification of the event. The operator at the IED 100 will have a two-way communication with the technical support operator in an attempt to troubleshoot the event.

In another embodiment, upon an occurrence, upon a request, a schedule or for any other reason, the IED may send the instructional information by e-mail, FTP or other protocol to a remote computing device to view. The remote computing device may include a phone, mobile phone, PDA, personal computer (PC), laptop or other type of computing device designed for personal or industrial use. The data can be sent via direct connection or indirectly via a network, wireless or other indirect connection.

It is to be understood that the present disclosure may be implemented in various forms of hardware, software, firmware, special purpose processors, or a combination thereof. The IED also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The techniques of the present disclosure can be used to automatically maintain program data and provide field wide updates upon which IED firmware, e.g., operating instructions, can be upgraded. An event command can be issued by a user, on a schedule or by digital communication that will trigger the IED to go to the remote server and obtain the new program code. This will ensure that program data will also be maintained allowing the user to be assured that all information is displayed identically on all units.

In a further embodiment, the display 122 of the IED 100 is highly programmable to enable an end user to design customizable screens. The techniques of the present disclosure allow a user to custom make any desired screen of the display 122 in, for example, a revenue meter based upon any Modbus register available in the meter. That is, the display 122 can be configured to display any measured or calculated value in the meter by mapping the Modbus register (holding the measured or calculated value) to a data line or placeholder in a screen layout of the display. In addition, the user can modify the Modbus register to add custom scaling and/or formulas to allow a user to create any desired number out of the data from the register. This expands the functionality of the display to having any capability either a user or a regulatory body can conceive of. Moreover, the display or interface allows for customized labeling to provide notice and information to users as to measured parameters other than electricity that the meter might be accumulating such as steam, water, gas or other type of commodity.

Utilizing the techniques of the present disclosure, the user builds portions of the view screen based on the Modbus protocol readings the IED, or meter, has. This allows the user to add functionality to the meter even after the meter is installed by allowing the display to be constantly adjusted or reconfigured to have new functionality. Moreover, using the communication protocol values has a benefit in that it allows the user to be sure that what the meter is putting out by the protocol is available on the display and matches in numbers exactly without errors, truncations and rounding issues. This is important for revenue application wherein data integrity is paramount.

Figure 4:
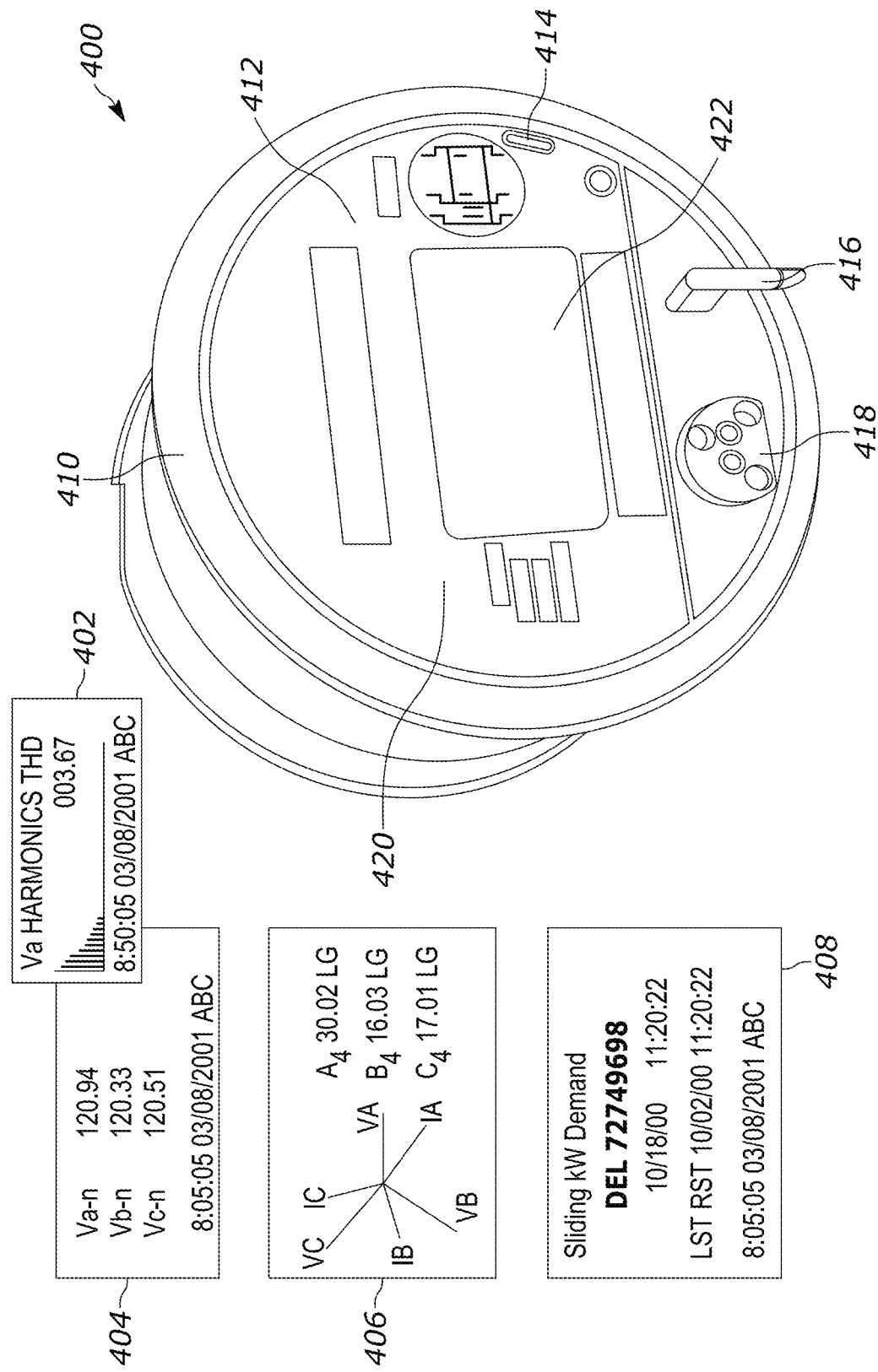
FIG. 4 illustrates an exemplary revenue meter and exemplary screens configured in accordance with the present disclosure.

Referring to FIG. 4, an exemplary revenue meter 400 is shown. The meter 400 includes at least the components describes in relation to the IED 10 shown in FIG. 1. The meter 400 includes display 422 which is programmable by the end user. Also illustrated in FIG. 4 are several exemplary screen shots 402, 404, 406, 408 of display 422, which have been programmed via the techniques of the present disclosure.

The meter 400 includes a generally cylindrical housing 410 with the display 422 disposed upon a face 412. The face 412 of the housing 410 includes various controls and indicators. A mode switch 414 is provided to enable a user to activate different modes, e.g., three modes, with each mode displaying on the display 422 different information. The mode switch 414 is activated by swiping a magnet over the mode switch 414 on the face 412 of the meter 400. Reset switch 416 is provided to reset demand in the meter.

An optical port 418 facilitates infrared communication with the meter by an external device such as a reader, computing device, notebook computer, etc. The display 422 of the meter 400 can be programmed in accordance with the techniques of the present disclosure by a computing device coupled to the meter via the optical port 418. The computing device can be coupled to the meter for programming the display by any of the other means described above in relation to the communication device 134, e.g., hardwired or wireless connectivity, a USB connection, a RS-485 or RS-232 connection, etc.

An infrared test pulse 420 is also provided on the face 412 for verifying the accuracy of the meter 400 in revenue applications.

Figure 5:
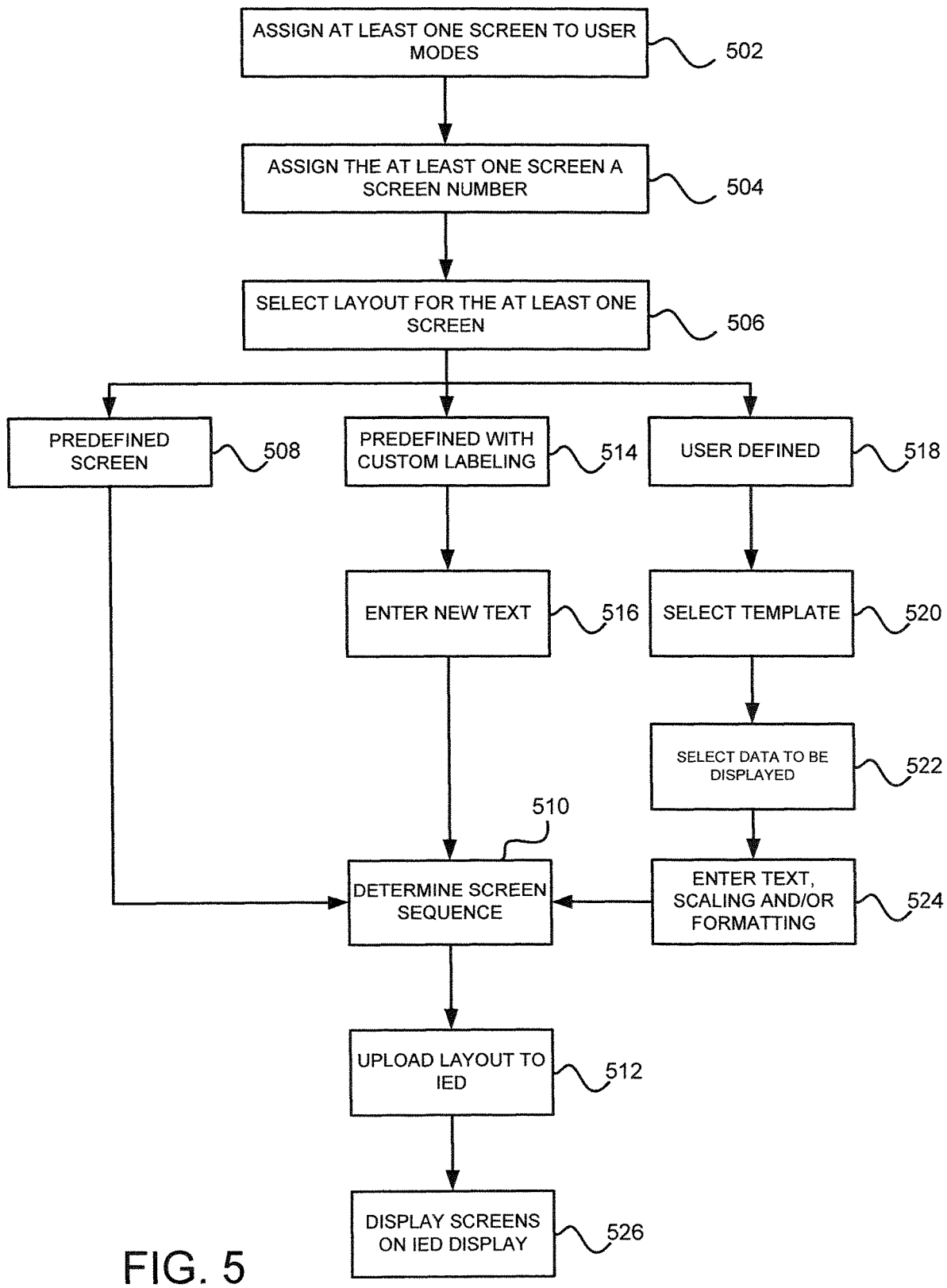
FIG. 5 is a flow chart illustrating a method for programming a display of an intelligent electronic device in accordance with an embodiment of the present disclosure.

A method for assigning screens to user modes and for creating new customized screens will be described below in relation to FIG. 5. Furthermore, the programming interface to create the customized screens will also be described.

Initially, in step 502, display screens are assigned to one of at least three possible user modes. A plurality of displays screens are available, for example, 76, which may be allocated to the 3 modes in any combination the user wishes. In one embodiment, the screens are identified by 3 digit numbers, assigned by the user. In certain embodiments, the screen numbers will show in all 3 modes. In some embodiments, some screens cannot show their screen number (e.g., phasors, harmonics, segment test screens). These will still have 3-digit numbers for identification purposes although they will not show. When assigning screens to the 3 modes, the user may choose any of three types of layouts: 1) standard previously-programmed layouts, or predefined layouts; 2) predefined layouts with custom labeling and/or new custom layouts, also know as user defined layouts. There are no limitations on mixing the 3 types of layouts (standard, standard with customized titles, and user-defined).

Next, in step 504, a screen number is assigned to each screen layout being used. Then in step 506, a standard layout, a standard layout with customized titles, or a new custom layout is selected for each screen. If a standard layout is employed, the layout is retrieved from memory in step 508. It is to be appreciated that no other programming is required when using the standard or predefined layout. If using a standard layout with customized titles, the layout is retrieved from memory of the programming device, in step 514 and the user is prompted to enter new text for the data being displayed in step 516. If a new custom layout is selected in step 506, the layout editor is invoked to define the layout and all its parameters, step 518. Here, a template is selected (in step 520), and the user may selected any data that is available in the meter to be displayed (step 522). Optionally, in step 524, scaling factors may be applied to the data selected and text is entered for each of the data selected.

Figure 6:
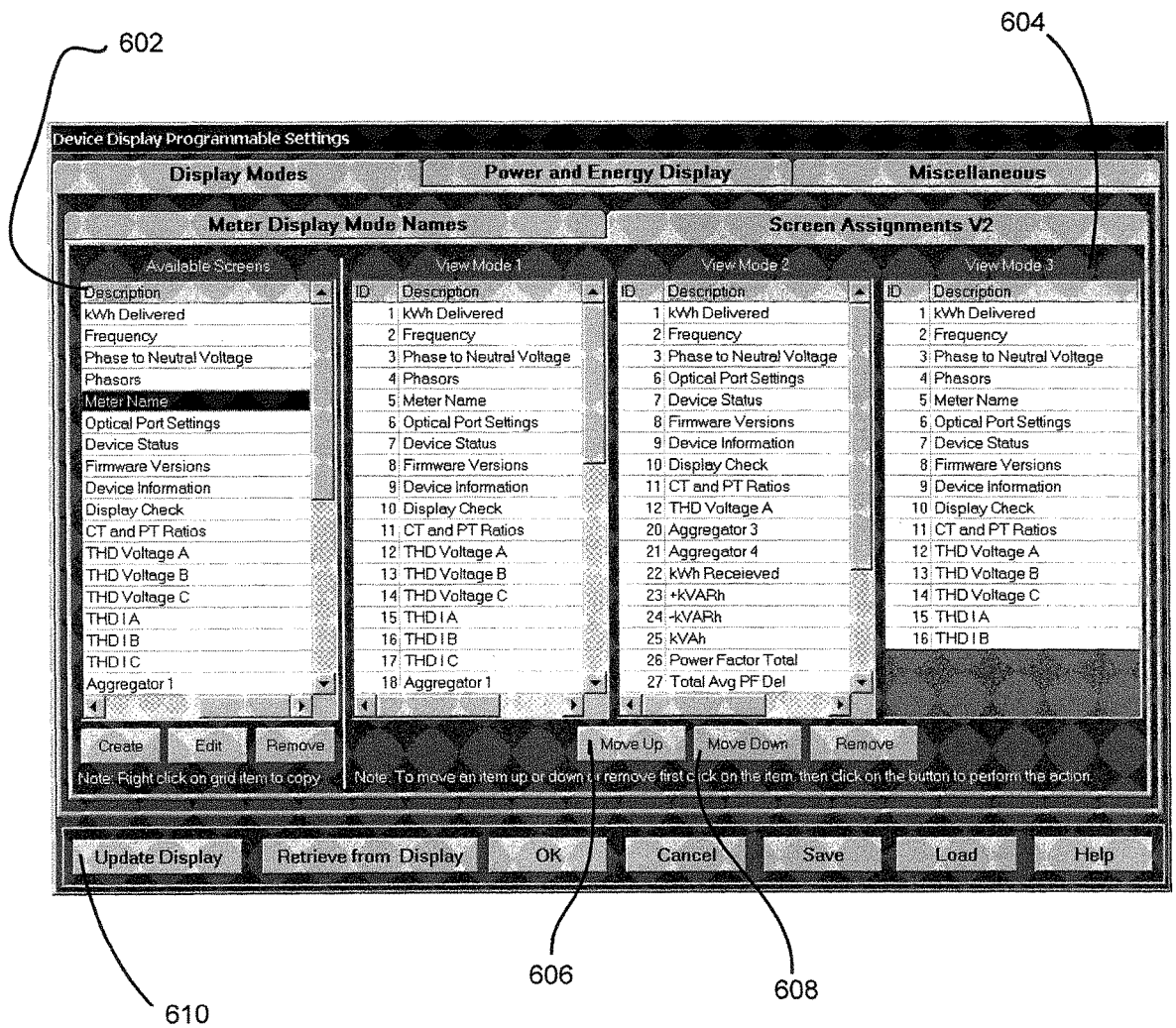
FIG. 6 illustrates a programming interface used to define various display modes and screens associated to each display mode.

After all the layouts have been defined, the user will list the screen numbers for each mode in the proper sequence for display scrolling, in step 510, as shown in FIG. 6. Screens are identified by the user-defined numbers assigned above. In FIG. 6, window 602 lists all the available screens. Window 604 includes a list for each user mode, e.g., View Mode 1, View 2, and View Mode 3. Any available screen can be selected from window 602 and assigned to one of the three View Modes. Once assigned, the screen will appear in the appropriate assigned View Mode window 604. From each View Mode window, the screens can be arranged in any desired display sequence via move up button 606 and move down button 608. Then, the screen layouts are uploaded to the meter via update display button 610, in step 512, and the meter will begin to display the screens in the order determined by the user, in step 526.

It is to be appreciated that the programming of the screen layouts may be preformed while the meter is connected to a computing device executing the display programming software, or alternatively, the programming may be performed offline and uploaded to the meter at a later time.

Upon the screen layouts being uploaded to the meter, the screen layouts will be stored in memory, e.g., memory 128 described above. In one embodiment, the screen layouts include a first look-up table associating the defined data in the screen placeholders with a register of a Modbus map. A second look-up table is also stored in memory which associates the Modbus registers with locations in the memory where measured and calculated data are stored. In operation, as a screen layout is displayed, the processor of the meter will read the data defined in the placeholder of the screen layout and use this information to determine the associated Modbus register from the first look-up table. The processor then employs the second look-up table to determined the location in memory, e.g., RAM, flash, etc., of the desired data based on the Modbus register.

Figures 7, 8:
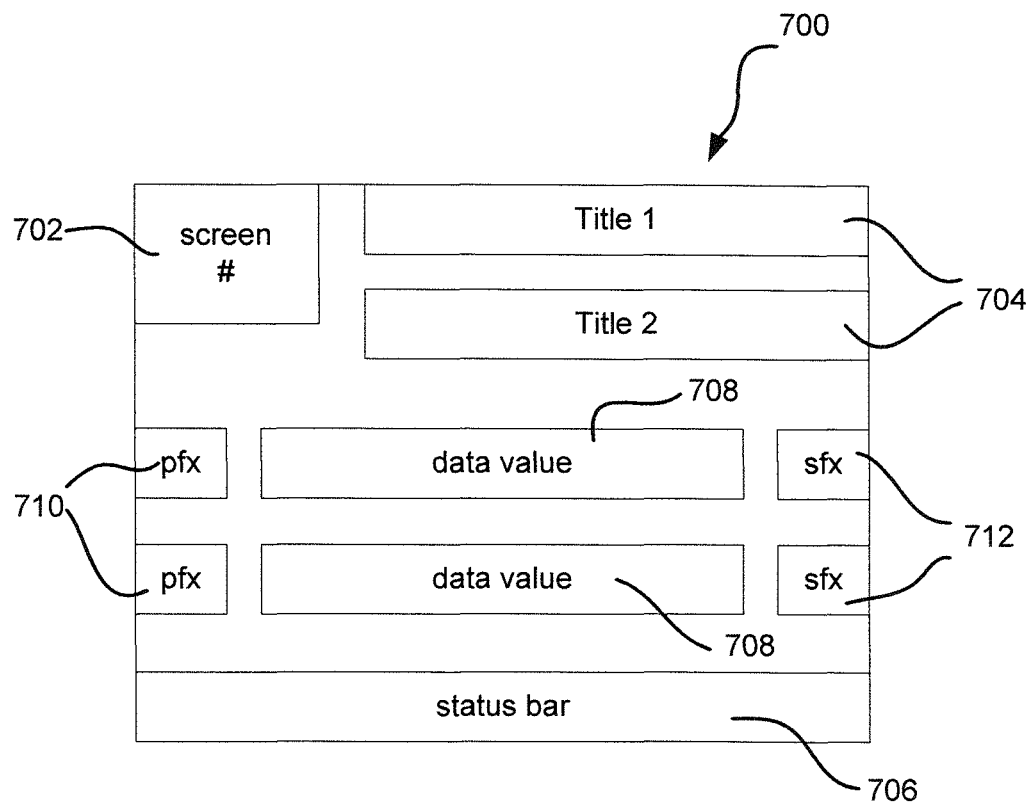
FIG. 7 illustrates a screen layout template in accordance with the present disclosure.
FIG. 8 is a table illustrating various available configurations of a display layout in accordance with the present disclosure.

Each of the three different types of screen layout will now be described in more detail. The standard layouts conform to the general arrangement shown in FIG. 7, shown for 2 entities. Features of this template include: a 3-digit screen number in the upper left corner 702 (default) or screen number not shown (optional); 0, 1, or 2 lines of title text 704, placed to the right of the screen number and left-aligned with each other, the location of text 704 does not change even if the screen number is not shown; and a status bar 706 across the bottom, which shows date, time and phase (if there are inputs). The template of FIG. 7 further includes 1 to 5 lines of variable data values 708 in the space between titles 704 and status bar 706 with optional prefixes 710 and suffixes 712 for each line. Examples of the standard or predefined layouts include meter data, WH Delivered, WH Received, kVARh per Quadrant, kVAh per Quadrant, Rolling W Demand Delivered, Block W Demand Delivered, etc.

The user may elect to modify the text in the standard layouts. The user may specify one or more custom layouts that conform to the template shown above. Such layouts are limited to no more than 5 Modbus entities (i.e. a voltage, power, energy, timestamp, etc.) and all entities must be homogeneous, meaning that they are all subject to the same conversions and formatting. Thus it is allowed to show W, VA, & VAR together, but not W & Wh. The user may specify one or more custom layouts that conform to a second template, described below, which displays a single entity and its associated timestamp, optionally conditioned by a status register. Standard and custom layouts may be mixed freely in all 3 user modes.

The next type of layout is a standard layouts with user-specified text or custom labeling. Here, for any standard layout conforming to the template shown above, the title, prefix, and suffix strings may be overridden with user text, up to 16 characters per title line, 3 per prefix, and 2 per suffix. For those standard layouts not conforming to the template, some may still have their titles overridden while others may not. The table below itemizes the user's options. Only those layouts that don't match the template are listed.

| Standard Layout Number | Description | Text Override Options | Reason |
|---|---|---|---|
| 18 | Phasors | None | No title |
| 20 | VAR, PF, & Frequency | Title | Non-homogeneous data |
| 21-26 | Harmonics | Title | No prefixes or suffixes |
| 60 | Segment check | None | No text |
| 64 | Optical Port Settings | Title | Non-homogeneous data |
| 65 | Comm Ports | Title | Non-homogeneous data |
| 66 | Nexus Status | Title | Non-homogeneous data |
| 67 | Firmware Versions | Title | Non-homogeneous data |
| 68 | Nexus Info | Title | Non-homogeneous data |
| 76-77 | Rolling/Block Demand | Title | No prefixes or suffixes |
| 80-89 | TOU Energy | Title | No prefixes or suffixes |
| 90-93 | TOU Demand | Title | No prefixes or suffixes Note: Standard layout has 3 titles but only 2 may be overridden. In this case, the $3^{rd}$ is omitted. |
| 94-95 | TOU +/− VARh | Title | No prefixes or suffixes |

User-defined layouts will conform to either of 2 templates, one of which is shown in FIG. 7. As described above, a 3-digit screen number 702 in the upper left corner (default) or screen number not shown (optional); 0, 1, or 2 lines of title text 704 up to 16 characters each, placed to the right of the screen number and left-aligned with each other; and a status bar 706 are provided. Firmware will choose font sizes to be as large as possible given the amount of data to be shown. Where possible, data values 708 will be in large font and titles 704 in medium font relative to the data values. Firmware will also space the lines to achieve a balanced appearance. In one embodiment, the maximum data size per entity is 8 Modbus registers.

The user-defined layout further includes 1 to 5 lines of variable data values 708 in the space between titles 704 and status bar 706. Data must be homogeneous, i.e., apply the same transforms and formatting to all lines. Each line of data may optionally have a prefix 710 (different for each line) and/or a suffix 712 (same for all lines). For instance, a screen showing phase to phase voltages might have a single title (Volts P-P), 3 lines of data with prefixes (Vab, Vbc, Vca), and the same suffix (MV) on all 3 lines. The title, prefix, and suffix strings may include a dynamic scale character, i.e., a special symbol (~) to be replaced by firmware with the appropriate scale character "on the fly". Screen real estate limits the number of title lines vs. number of data lines as shown in the table of FIG. 8.

Figure 9:
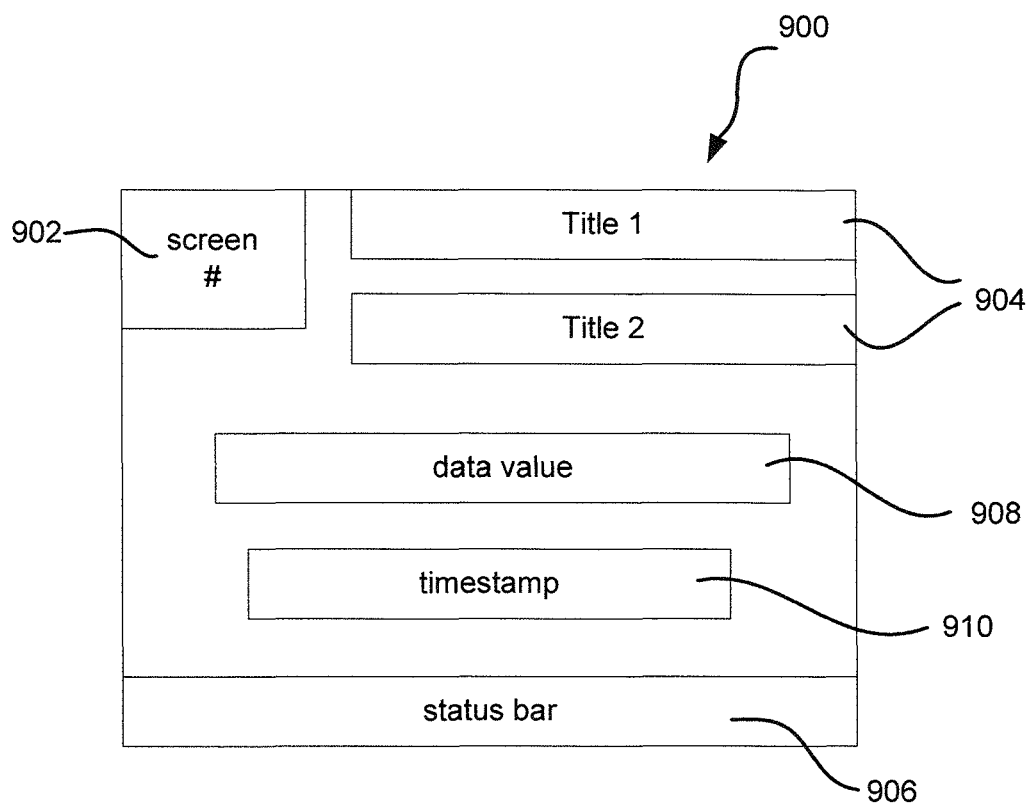
FIG. 9 illustrates another screen layout template in accordance with the present disclosure.

Referring to FIG. 9, a second type of template 900 for a user-defined custom layout is provided. Similar to the template shown in FIG. 7, a screen number 902, title texts 904 and a status bar 906 are provided. 2 lines of variable data values in the space between titles 904 and status bar 906 are provided. The upper line 908 may be anything but is typically a demand; the lower line 910 is a timestamp. Each is centered on its respective line. An optional third entity is also polled but not displayed. This is interpreted as a status register indicating the validity of the remaining entities, such as the registers that indicate when demand or TOU data is ready. The title strings 904 may include a dynamic scale character, i.e., a special symbol (~) to be replaced by firmware with the appropriate scale character "on the fly".

In the user-defined custom layouts, data can be transformed or formatted by the end user. Transformation of the data from raw form per the Modbus Map to properly scaled and formatted values on the screen will occur in 3 steps, each specified separately as follows:

1. Conversion from raw form to measured value, such as secondary volts or watts. Conversions will be specified as a bit-mapped word in which multiple bits, or no bits, may be set as appropriate.
2. Numeric transforms perform such conversions as secondary to primary multiplication, or multiplication by a user-set multiplier. Transforms will be specified as a bit-mapped word in which multiple bits, or no bits, may be set as appropriate.
3. Formatting for display will specify how to show the results on screen. For scaled numeric data, this will include scale, number of digits (1-10), decimal point placement (0-9), and formatting options. In addition to the usual K, M, etc., scale may be none or auto, indicating that all 1-5 entities on screen are to be scaled together (Template of FIG. 7) or just that firmware is to set the scale (Template of FIG. 9). Options specify use of sign and leading zero characters. For displaying scaled energy, it is up to the user to specify a format compatible with the programmable settings. For unscaled or non-numeric data, the same bytes will be text abbreviations indicating the form of the data, such as ASCII text, timestamp, power factor, etc.

For the raw conversion bits, meaningful combinations are no bits set, any single bit set, or signed entity bit plus one other set, but other combinations will be executed except as noted.

Signed Entity
    Indicates that the registers polled contain a signed number.

Divide by 65536
    Converts entities such as RMS volts, frequency, or 1 second watts to floating point representation.

Divide by 100
  Converts entities such as angles or percentages to floating point representation.
BCD to Binary
  Converts entities such as packed BCD energy registers into binary. Ignores all other bits.
RTU Power
RTU Current
RTU Voltage
RTU Frequency
  Converts current, voltage, power, or frequency entities from RTU format to floating point representation; ignores all other bits.
Numeric transform bits include:
Multiply by CT Ratio
Multiply by PT Ratio
  Set one or both of these bits to convert from secondary readings to primary.
Multiply by User-Set Factor
  Multiplies the converted value by the factor specified with the layout.
  Different layouts may have different factors.

For format bits, individual bytes will specify the scale, number of digits, and number of decimal places. Scale will be a single ASCII character, N for none, A for auto, k for kilo, M for mega, G for giga. Number of digits will be an ASCII number, 1-9 for 1-9 digits or 0 for 10 digits. Number of decimal places will be an ASCII number, 0-9 for 0-9 places. For non-numeric data, the same 3 bytes will be 3 character abbreviations:
  TXT for text
    Text will be left-justified if there is a prefix on the line, centered if not.
  PF_ for power factor (_ is a space.)
    Power factor will be formatted according to the method selected in Nexus programmable settings.
  TIM for time
  DAT for date
  TS_ for timestamp (_ is a space.)
    Timestamp will be of the form "mm/dd/yy hh:mm:ss" with date month/day ordering per the date format setting in the display's programmable settings. Date and time will be their respective portions of the timestamp.
  Sxx for status; 4 forms are possible:
    ST1 Show 0 data as "NOT OK" and non-zero data as "OK".
    ST0 Show 0 data as "OK" and non-zero data as "NOT OK".
    S##, where ## is 00 through 15.
      Only the ## bit in the register is tested; shows OK if the bit is 0. Bits are numbered LSB to MSB.
    S##, where ## is 15 through 31.
      Only the (##-16) bit in the register is tested; shows OK if the bit is 1
Furthermore, the following option bits are provided:
Show Sign
  Causes numeric data to always show either a plus or minus sign before the first digit.
Force Positive
  Shows the absolute value of the data.
Force Negative
  Causes numeric data to always show a minus sign before the first digit, even if the data is unsigned.
A user-set multiplier value will be specified as a 5 character text string containing only digits and optionally a single decimal point and/or minus sign. Leading digits may be either spaces or zeroes, but 5 characters are required. Scientific notation (e.g. 1.2E6 for 1,200,000) is also accepted.

FIG. 10 is a table showing which of the types of data values F1-F67 are supported plus the conversion and transform bits typically used with each. In order to not limit the flexibility of the system, firmware will execute as many of the specified conversions and transforms as possible, and will not restrict itself to those shown in the table. Conversions that would require changing the basic entity representation, such as text to numeric, will not be attempted.

The display will not have sufficient information in custom user layouts to perform range validation on Modbus data. For example, both angles and percentages use the same "divide by 100" conversion formula and are therefore indistinguishable, yet valid angles are −180 to +180 while valid percentages are −327.68 to 327.67. The display is relying on the meter or IED to provide sensible data.

By supporting only layouts conforming to the given templates, the system defined here precludes very dense screen arrangements as well as many involving non-homogeneous registers.

The display supports a subset of characters in the ASCII set. Unsupported characters are skipped over. The supported characters available for user-defined text fields is: all upper & lower case letters, digits 0-9, space, + sign, − sign, period, forward slash, colon, question mark.

A user-defined field is provided for setting for time to show each screen when scrolling. i.e., dwell time while scrolling. The dwell time while scrolling default is 7 seconds, and has a range from 3 to 30 seconds.

Screen layout definitions are mixed binary and ASCII with a fixed size for each layout type. All definitions are placed into a common block in no specific order. Size of this block is 3840 bytes (64 bytes per layout*60 custom layouts, or 50 bytes per layout*76 layouts). 8 layout types are defined. Layout 0 is used to specify one of the standard layouts, layout 1 is for one of the standard layouts with user text changes. Layouts 2 through 6 specify custom layouts conforming to the template shown in FIG. 7 with 1 to 5 lines of data, respectively. Layout 7 is for custom layouts conforming to the template shown in FIG. 9. FIG. 11 itemizes the exact definition for each layout.

Text strings for all titles, prefixes, and suffixes in the template are embedded in the layout definition as is a string for the user-defined multiplier in some layouts. Each is an ASCII string placed in a fixed-length field. Strings shorter than the field length should be null padded at the end. Unused strings or strings in standard layouts to be displayed using default text should be all nulls. Titles, prefix, and suffix strings may include the tilde character (~) as the dynamic scale substitute. This character was chosen because it is not included in any of the display's fonts. It causes firmware to substitute the actual scale in the indicated position while running.

Referring to FIG. 11, layouts 0 and 1 cover all the standard layouts. Layout 0 specifies a standard layout with no text changes and is the most compact at only 5 bytes. Layout 1 specifies a standard layout with text changes and requires 54 bytes. User interface software prevents potential user confusion by only permitting the strings applicable to each screen to be changed. Firmware will ignore any text provided that does not apply to the given standard layout. Examples, shown as Layout 0 and Layout 1:
Screen Layout 0 (phase to neutral voltage):

| 0 × 0009 0 × 00 0 × 10 | 0 × 00 | | | | | |
| 0 × 0009 0 × 01 [32 zero bytes] | ~V | Van | Vbn | Vcn | [6 zero bytes] 0 × 10 0 × 00 |

Screen Layout 1 (PF):

| 0x007B | 0x00 | 0x39 0x00 |
| 0x007B | 0x01 | PF [47 zero bytes] 0x39 0x00 |

Layouts 2 to 6 cover user-defined screens with 1 to 5 homogeneous Modbus entities shown. The definition follows a consistent format that grows with the number of entities. Each of the fields shown for layouts 2-6 in FIG. 11 will now be described.

User screen number and layout number are the standard first 3 bytes for all layouts. Title, prefix, and suffix strings, up to maximum length without termination, null padding at the end of any short string. Entity size is the number of Modbus registers to poll for each entity, e.g. 2 for voltage, 4 for timestamp, etc. Since the entities are homogeneous, all require polling the same number of registers. Entity registers comprise a list of the starting Modbus addresses of the 1 to 5 entities to be polled. The 2 raw conversion bytes form a word of bit-mapped flags identifying how to convert the raw data into meaningful units. The raw conversion bits are as listed above and in FIG. 10. The 2 numeric transform bytes form a word of bit-mapped flags identifying the numeric transforms applied to obtain the properly scaled value to be displayed. The numeric transform bits are as listed above and in FIG. 10. The format string is 3 ASCII characters telling how to format the result on screen. The formatting bits are listed above and in FIG. 10. The 2 format options bytes form a word of bit-mapped flags identifying general format options. The option bits are as listed above and in FIG. 10. The multiplier field is an ASCII string specifying the value of the user-defined multiplier for numeric transforms. This string may only have any 5 character format recognized by C as a floating point value. For example, 125.0 or 00125 or 125E0 all specify a multiplier of 125. Zero indicates no multiplier (same as multiplier=1). 5 characters are required; null terminate if needed.

Example

User Screen 12 (Frequency):

| 0 × 000C | 0 × 02 | FREQ [28 0's] | 0 × 0002 | 0 × 0000 N74 | 0 × 0000 | 1.000 | [2 0's] | 0 × 02 | [5 0's] | 0 × 00E3 |
| User screen num | layout 2 1 entity | 1 title | unsigned, div by 65536 | no add'l xforms | no scale 7 digits 4 dec plc | no options | no mult | no suffix | 2 regs per poll | no mult | 1 poll address |

Layout 7 shows an entity that has a timestamp associated with it, such as peak demand. It also has a status byte, not displayed, that alters the display when the status indicates that the entity is not yet valid. The definition requires 56 bytes. Bytes 0-2 are the user screen number and layout number, the standard first 3 bytes for all layouts. Bytes 3-34 are the 2 optional titles. This layout does not permit prefixes or suffixes. Bytes 35-48 are the raw conversion, numeric transform, format string, format options, and multiplier, and are identical to the same fields for Layouts 2-6. They apply to the first register. Formatting of the timestamp and status-related text requires no user input. Bytes 49-51 define the entity size and address. Bytes 52-53 give the address for the timestamp. 4 registers will be polled. Bytes 54-55 give the address for the status register. Non-zero status indicates OK. For zero status, the entity fields will display N/A and the timestamp will be omitted.

Layouts 8-255 are reserved for future. They are intended as a means of adding more complex user-defined layouts should the need arise.

The display is permitted access to password protected Modbus registers without use of the password by merit of its privileged location within the meter itself. This applies primarily to Time of Use registers. Conventionally, a block of special addresses was allocated for this purpose, i.e., the display would poll these registers instead of the normal ones. This method is not suitable for user-defined layouts because the user has no knowledge of these special addresses. The new approach to this problem is for the display to poll the meter using a special undocumented Modbus function code (0x33) for all its data polls. By this means, the meter can permit the display to access all registers while subjecting polls passed through from the optical port to the normal password restrictions.

Figure 12:
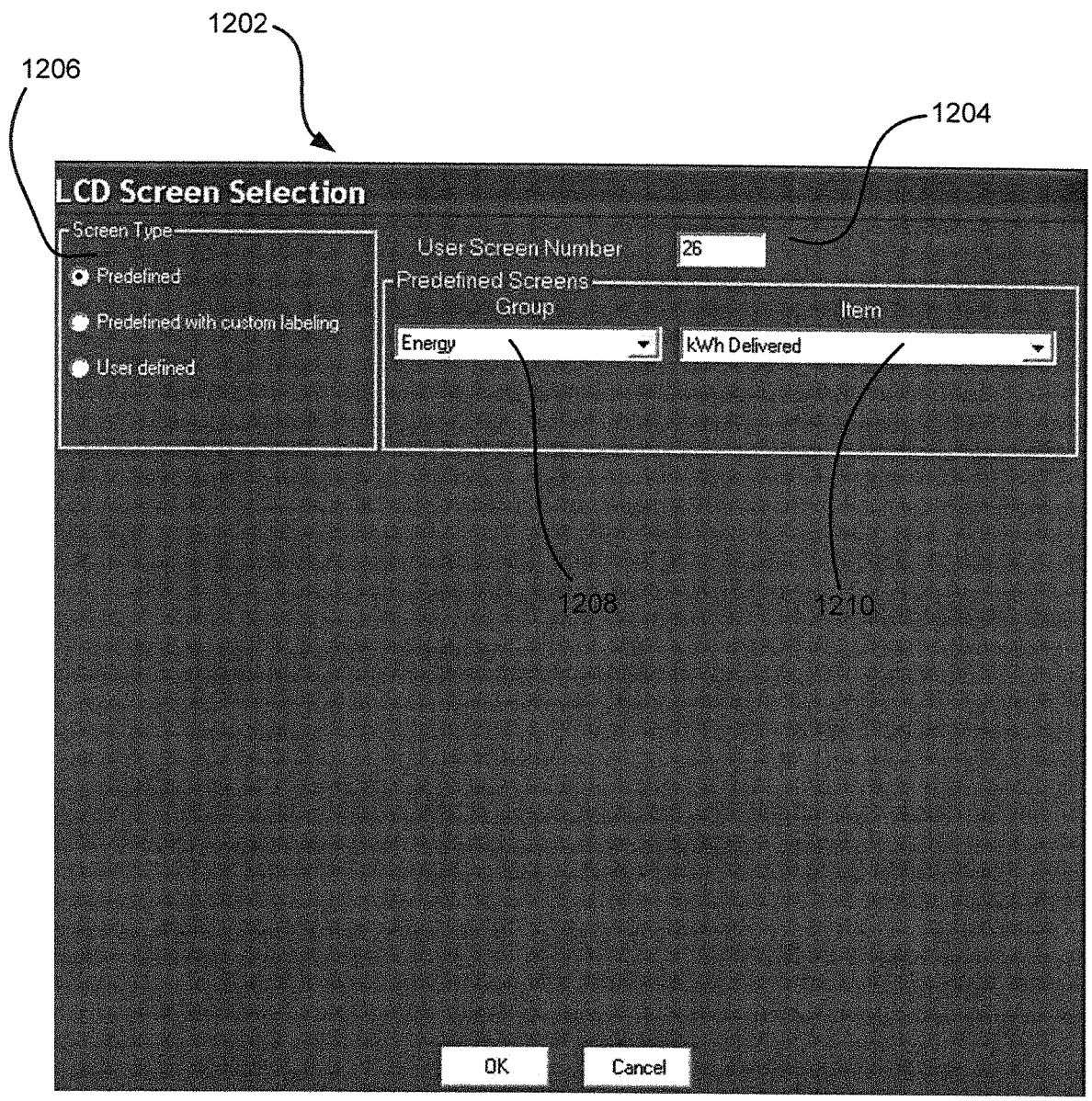
FIG. 12 illustrates a programming interface used to select a standard or predefined screen for use in a revenue meter in accordance with the present disclosure.
Figure 13:
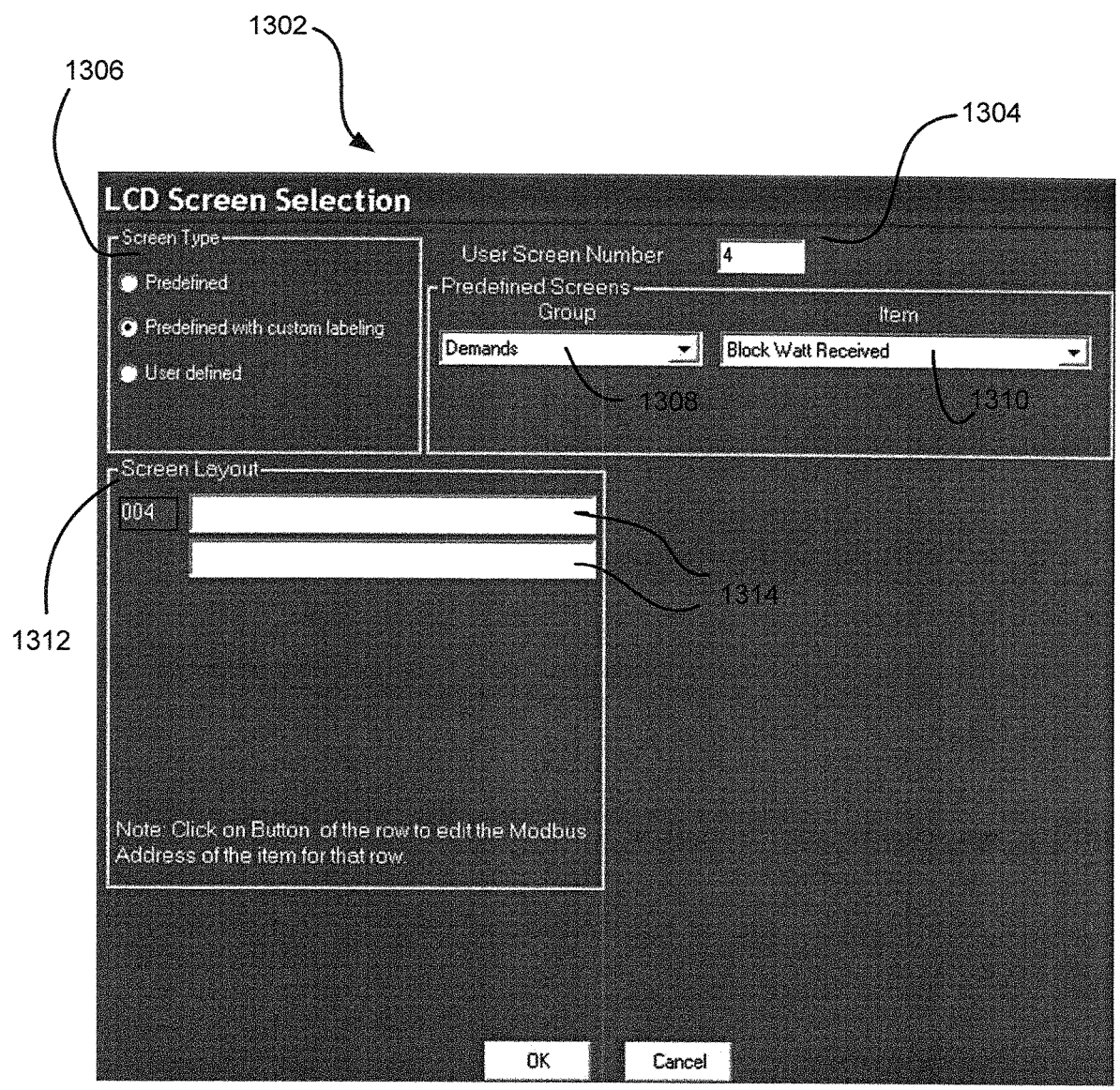
FIG. 13 illustrates a programming interface used to define a predefined with custom labeling screen for use in a revenue meter in accordance with the present disclosure.
Figure 14:
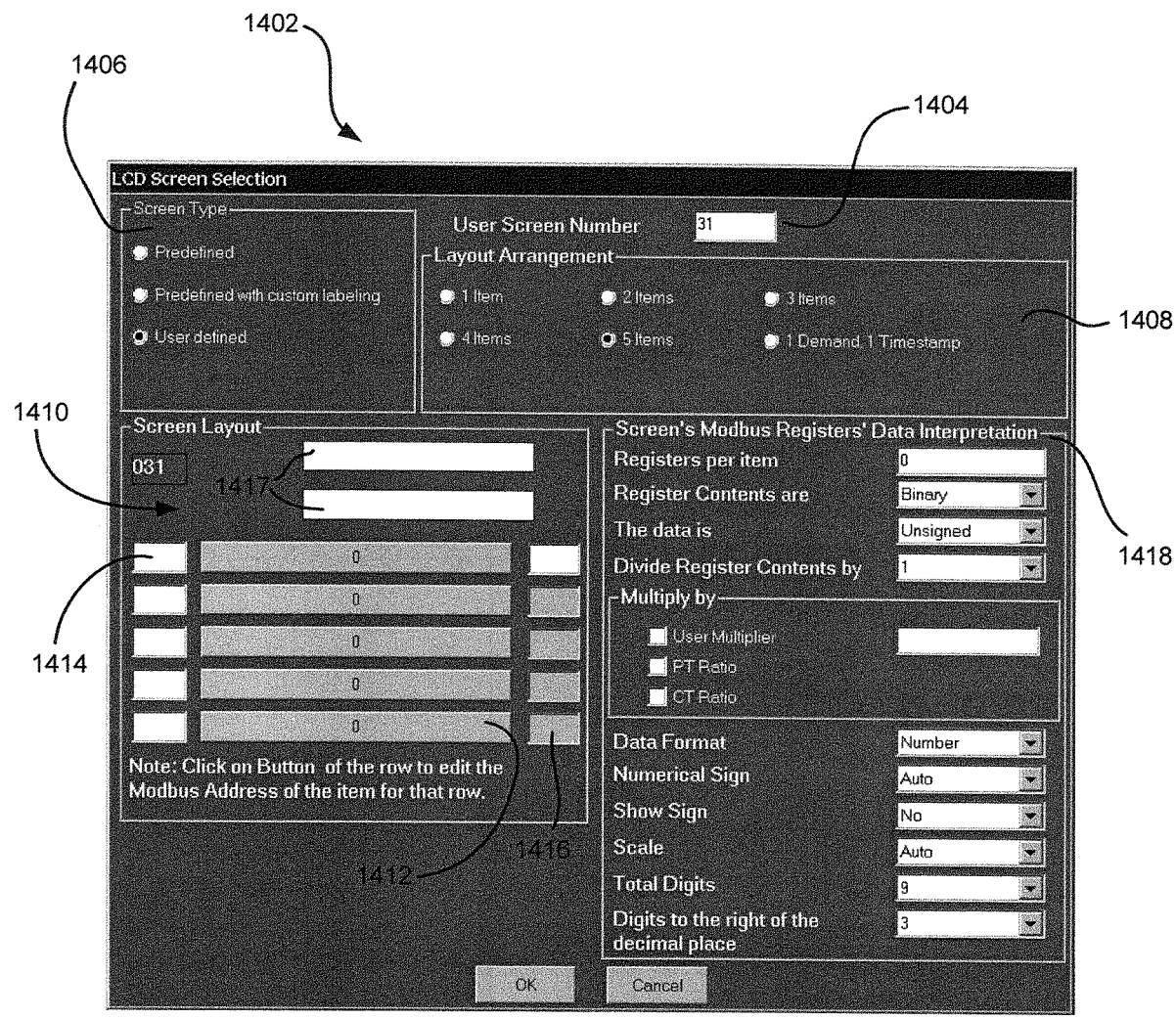
FIG. 14 illustrates a programming interface used to define a custom screen for use in a revenue meter in accordance with the present disclosure.

Referring to FIGS. 12-14, a programming interface is illustrated which facilitates creation of the custom user layouts and for entering user text for eligible standard layouts. A sequenced pair of windows is provided, the first to determine the general parameters of the layout and the second to be a form with the correct number and placement of boxes to be filled in by the user.

The initial window designated as 1202 in FIG. 12 is designed to obtain various pieces of information from the user. A user screen number section is provided 1204 and a screen type selection portion 1206 is provided for allowing the user to select one of the three types of screen layouts. Based on the screen type selection, the user will be prompted for more information, for example, if standard or predefined layout is selected, the user is prompted to select a predefined screen from predetermined groups. The predefined screens are classified into groups to narrow down the available number of screens. Here, a group of screens can be selected via drop down menu 1208, and an a screen from the selected group can be selected form drop down menu 1210.

It is to be appreciated that if a predefined screen layout is selected, no further editing or programming is required. The selected predefined screen can be uploaded and the meter will display the screen upon the upload.

If a predefined with custom labeling layout is selected via screen type selection portion 1306, the user will be presented with a window 1302 as shown in FIG. 13. As in FIG. 12, the user screen number is adjustable via section 1304 and a predefined screen can be selected via group down menu 1308 and item drop down menu 1310. In the screen layout section 1312, labels 1314 for the data associated with the screen layout can be modified by the user.

If the user defined or custom layout is selected, the user will be presented with a window 1402 as shown in FIG. 14. The window designated as 1404 in FIG. 14 is designed to obtain the various pieces of information from the user. In addition to the user screen number section 1404 and the screen type selection portion 1406, a layout arrangement section 1408 is provided for prompting the user to select how much information is to be displayed on the screen, e.g., 1-5 items or 1 demand, 1 timestamp. Based on the selection in the layout arrangement section 1408, a screen layout section 1410 is generated to loosely mimic the template shown in FIG. 7 when a number of items is selected or the template shown in FIG. 9 when the 1 Demand, 1 Timestamp is selected. When a number of items is selected, the screen layout section 1410 includes a text box for each data line 1412, a text box for each prefix 1414 and a text box for the suffix 1416. In the example of FIG. 14, five items are selected and five lines of items are generated in the screen layout section 1410. Furthermore, the screen layout section 1410 includes a text box for screen titles 1417. Depending on the number of items selected, the number of lines for the screen titles or labels is dictated by table shown in FIG. 8.

Figure 15:
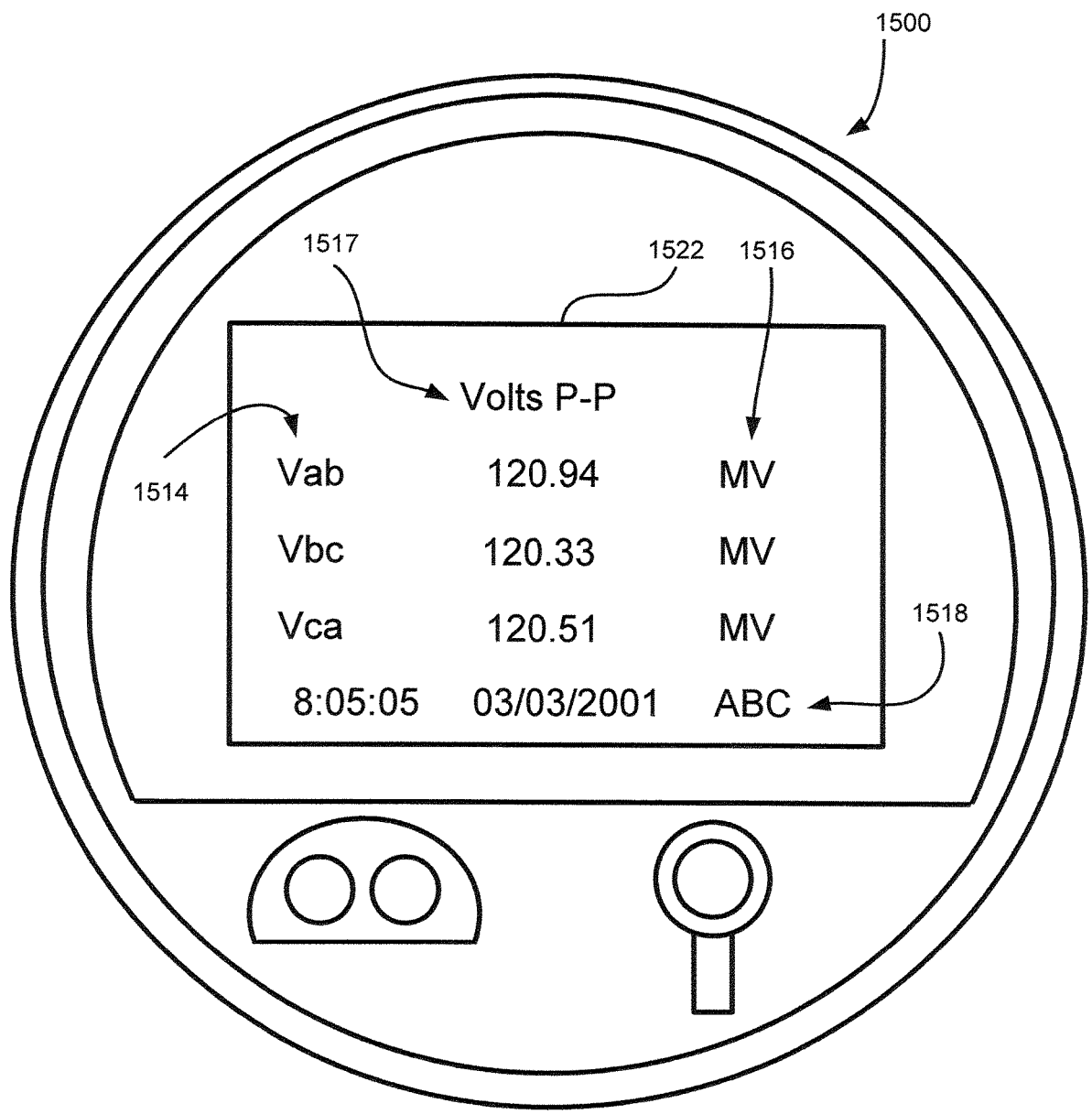
FIG. 15 is a front view of a revenue meter displaying a custom screen layout in accordance with the present disclosure.

As an example, a screen containing phase to phase voltages might have a single title "Volts P-P", three lines of data with prefixes "Vab", "Vbc", "Vca", and the same suffix "MV" on all three lines. Referring to FIG. 15, meter 1500 illustrates this example. Display 1522 includes title 1522, prefixes 1514 for each of the three lines of data and suffixes 1516 for each of the three lines of data. The display 1522 further includes a status bar 1518 showing the time, date and phase.

For each data item or entity 1412, the user can define what is placed in the field by employing the meter's Modbus map to identify the data that is desired to be displayed. This could be a selection from a list, entry of a Modbus address, or some mix of these approaches. The Modbus map defines what the data is (e.g., voltage readings, current readings, etc.), where the data is stored (e.g., data addresses), and how the data is stored (data types, byte and word ordering) in the meter, in accordance with the Modbus protocol which is incorporated by reference. In one embodiment, the desired data is defined by entering the starting value of the Modbus Register containing the data for the item. Once the starting value of the Modbus Register is entered, details for each entry are added via interpretation section 1418, i.e., screen's Modbus registers' data interpretation section, e.g., a number of registers per item, what the registers contents are, if the data is signed or unsigned and if to divide the register contents by a number.

Once the data is selected or the Modbus address entered into field 1412, the data can be modified via interpretation section 1418, i.e., screen's Modbus registers' data interpretation section. In the embodiment shown, check boxes for raw conversion bits, text entry for numeric transforms, and drop-down menus for format options are provided. Suitable controls for scale, number of digits, and number of decimal places are also provided. Optionally, a text box for user-set multiplier is provided. The table below shows the fields of the screen's Modbus registers' data interpretation section and valid entries for each.

| ENTRY FIELDS | POSSIBLE ENTRIES |
| --- | --- |
| Register per item | 1-8 |
| Register contents | Binary, BCD, Text, Scaled Energy |
| Data | Signed, Unsigned |
| Divide contents by | 1, 100, 65536 |
| Multiply by | User multiplier (enter in blank field), PT Ratio, CT Ratio |
| Data format | Number, Text, Power factor, Time Date, Time & Date, Status indicator |
| Numerical sign | Auto, Forced negative, Forced positive |
| Show Sign | No, Yes |
| Scale | Auto, None, kilo (k), Mega (M), Giga (G) |
| Total digits | 1-10 |
| Digits to the right of the decimal place | 1-8 |

It is to be appreciated that although the embodiments described illustrate a meter or IED with a display disposed directly on the meter or a housing thereof, it is contemplated to be within the scope of this disclosure that the programmable display can be an external device which is located remotely from the meter and coupled to the meter by wired or wireless means.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

Furthermore, although the foregoing text sets forth a detailed description of numerous embodiments, it should be understood that the legal scope of the invention is defined by the words of the claims set forth at the end of this disclosure. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than in the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. An electronic power meter for monitoring power usage of an electrical circuit, the electronic power meter comprising:
   a housing;
   at least one sensor coupled to the electrical circuit, the at least one sensor configured for measuring at least one power parameter of the electrical circuit and generating at least one analog signal indicative of the at least one power parameter;
   at least one analog to digital converter coupled to the at least one sensor, the at least one analog to digital converter configured for receiving the at least one analog signal and converting the at least one analog signal to at least one digital signal to obtain measured data;
   at least one processor configured for receiving the at least one digital signal and performing at least one calculation based on the received at least one digital signal to obtain calculated data;
   a memory coupled to the processor, the memory comprising at least one memory location, the memory configured to store the measured data and the calculated data, the measured data and calculated data having at least one data type of a plurality of data types, the memory further configured to store a plurality of screen layouts, each screen layout including at least one data placeholder defining at least a location on the screen layout;
   a user interface including a display device disposed on a face of the housing, the user interface configured for receiving a portion of the measured data and calculated data from the at least one memory location and for receiving the plurality of screen layouts; and
   a communication interface for coupling to at least one external computing device, at least one external computing device configured for programming the user interface, the communication interface further configured for transmitting the stored measured data and the calculated data according to a communication protocol to the at least one external computing device;
   wherein the user interface enables an end user to customize the plurality of screen layouts using a configurator, the configurator configured to map registers from the at least one memory location to at least one data placeholder in each of the plurality of screen layouts, the configurator enabling the end user to define the data type to be displayed in each of the at least one data placeholder of each of the plurality of screen layouts; and
   wherein the configurator further enables the end user to select an order in which the plurality of screen layouts is presented on the display device,
   wherein the memory is further configured to store a first look-up table associating the data type defined with respect to the at least one data placeholder to a register defined by the communication protocol and a second look-up table associating the register to at least one memory location in memory, the register is a Modbus register, and
   wherein measured data and calculated data displayed on the display device for a particular communication protocol register exactly matches transmitted measured data and calculated data from the particular communication protocol register.

2. The electronic power meter of claim 1, wherein the configurator includes Boolean logical operators.

3. The electronic power meter of claim 1, wherein the configurator is at least one of a programming interface and programming language.

4. The electronic power meter of claim 3, wherein the at least one of the programming interface and programming language allows for customized screen descriptions of displayed parameters.

5. The electronic power meter of claim 3, wherein the at least one of the programming interface and programming language allows an end user to create a new calculation value using a mathematical operator including multiplication, division, addition or subtraction.

6. The electronic power meter of claim 1, wherein the data types include at least one of voltage, current, kWh, power, power factor, reactive power, frequency, harmonics, and/or phasors.

7. The electronic power meter of claim 1, wherein the configurator enables an end user to select a dwell time for the presentation of the plurality of screen layouts, wherein the dwell time defines a period of time for displaying each of the plurality of screen layouts on the display device in the selected order.

8. The electronic power meter of claim 1, wherein the at least one screen layout applies at least one of a user-defined scaling factor, a user-defined numeric transform, and/or a user-defined format to the at least one data placeholder.

9. The electronic power meter of claim 1, wherein the housing is a socket-type meter housing, wherein the display device is disposed on a face of the socket-type meter housing.

10. The electronic power meter of claim 9, further comprising a demand reset switch disposed on the face of the housing, the demand reset switch configured to reset a demand value measured or calculated by the processor.

11. The electronic power meter of claim 9, wherein the communication interface includes an optical port disposed on the face of the housing, the optical port configured to enable communication with at least one external computing device.

12. The electronic power meter of claim 11, wherein the optical port is configured to receive the at least one screen layout, the first look-up table and the second look-up table from the at least one external computing device.

13. The electronic power meter of claim 1, wherein the communication protocol is Modbus protocol.

14. The electronic power meter of claim 1, wherein the user interface is further configured for enabling the end user to customize a label associated with the at least one data placeholder.

15. The electronic power meter of claim 1, wherein, the at least one external computing device includes a graphical user interface configured to enable the end user to customize any one of the plurality of screen layouts via user input, the graphical user interface further configured to generate and display a representation of at least one of the screen layouts to be displayed on the display device responsive to user input to customize the at least one of the screen layouts.

16. The electronic power meter of claim 1, wherein each screen layout including at least one first placeholder and at least one second placeholder, the at least one first placeholder defining where at least one first parameter of the measured data and calculated data is to be displayed on the display device and the at least one second placeholder defining where at least one second parameter of the measured data and calculated data is to be displayed on the display device, the at least one first and second parameters displayed on separate lines on the display device.

17. An electronic power meter for monitoring power usage of an electrical circuit, the electronic power meter comprising:

a housing;

at least one sensor coupled to the electrical circuit, the at least one sensor configured for measuring at least one power parameter of the electrical circuit and generating at least one analog signal indicative of the at least one power parameter;

at least one analog to digital converter coupled to the at least one sensor, the at least one analog to digital converter configured for receiving the at least one analog signal and converting the at least one analog signal to at least one digital signal to obtain measured data;

at least one processor configured for receiving the at least one digital signal and performing at least one calculation based on the received at least one digital signal to obtain calculated data;

a memory coupled to the processor, the memory comprising at least one memory location, the memory configured to store the measured data and the calculated data in the at least one memory location, the measured data and calculated data having at least one data type of a plurality of data types, the memory further configured to store a plurality of screen layouts, each screen layout including at least one data placeholder defining at least a location on the screen layout; and an interface including a display device disposed on a face of the housing, the interface configured for receiving a portion of the measured data and calculated data from the at least one memory location and for receiving the plurality of screen layouts from the memory, the display device configured for displaying the portion of received data as defined in accordance with a plurality of screen layouts;

wherein the interface enables a user to customize the plurality of screen layouts using a configurator, the configurator configured to map registers from the at least one memory location as defined by Modbus communication protocol to at least one data placeholder in each of the plurality of screen layouts, the configurator enabling the user to define the data type to be displayed in each of the at least one data placeholder of each of the plurality of screen layouts, the registers are Modbus registers; and wherein the configurator further enables the user to select an order in which the plurality of screen layouts is presented on the display device.

18. The electronic power meter of claim 17, wherein at least a portion of the registers are password protected time of use registers, wherein the interface accesses the password protected time of use registers without use of a password for display of the password protected time of use registers on the display device.

19. An electronic power meter for monitoring power usage of an electrical circuit, the electronic power meter comprising:

a housing;

at least one sensor coupled to the electrical circuit, the at least one sensor configured for measuring at least one power parameter of the electrical circuit and generating at least one analog signal indicative of the at least one power parameter;

at least one analog to digital converter coupled to the at least one sensor, the at least one analog to digital converter configured for receiving the at least one analog signal and converting the at least one analog signal to at least one digital signal to obtain measured data;

at least one processor configured for receiving the at least one digital signal and performing at least one calculation based on the received at least one digital signal to obtain calculated data;

a memory coupled to the processor, the memory comprising at least one memory location, the memory configured to store the measured data and the calculated data in the at least one memory location, the measured data and calculated data having at least one data type of a plurality of data types, the memory further configured to store a plurality of screen layouts, each screen layout including at least one data placeholder defining at least a location on the screen layout; and an interface including a display device disposed on a face of the housing, the interface configured for receiving a portion of the measured data and calculated data from the at least one memory location and for receiving the plurality of screen layouts from the memory, the display device configured for displaying the portion of received data as defined in accordance with a plurality of screen layouts;

wherein the interface enables a user to customize the plurality of screen layouts using a configurator, the configurator configured to map registers from the at least one memory location as defined by Modbus communication protocol to at least one data placeholder in each of the plurality of screen layouts, the configurator enabling the user to define the data type to be displayed in each of the at least one data placeholder of each of the plurality of screen layouts, the registers are Modbus registers; and wherein at least a portion of the registers are password protected time of use registers, wherein the interface accesses the password protected time of use registers without use of a password for display of the password protected time of use registers on the display device.

20. The electronic power meter of claim 19, wherein an undocumented Modbus function code enables access to the password protected time of use registers without a password, the undocumented Modbus function code is present in each screen layout of the plurality of screen layouts regardless of user-enabled customization.

* * * * *